(12) United States Patent
Moursund et al.

(10) Patent No.: US 7,236,705 B2
(45) Date of Patent: Jun. 26, 2007

(54) METHODS AND SYSTEMS FOR ALIGNING AND MAINTAINING ALIGNMENT OF POINT-TO-POINT TRANSCEIVERS IN A NETWORK

(75) Inventors: Carter M. Moursund, San Diego, CA (US); Christopher T. Ulmer, Pasadena, CA (US)

(73) Assignee: Clearmesh Networks, Inc., Pasadena, CA (US)

( * ) Notice: Subject to any disclaimer, the term of this patent is extended or adjusted under 35 U.S.C. 154(b) by 792 days.

(21) Appl. No.: 10/162,475

(22) Filed: Jun. 3, 2002

(65) Prior Publication Data

US 2004/0208272 A1 Oct. 21, 2004

(51) Int. Cl.
  *H04B 10/00* (2006.01)
(52) U.S. Cl. ................................. 398/129; 398/131
(58) Field of Classification Search ............ 398/122, 398/128–131
  See application file for complete search history.

(56) References Cited

U.S. PATENT DOCUMENTS

| | | | |
|---|---|---|---|
| 4,807,202 A | 2/1989 | Cherri et al. ............... 367/129 |
| 5,062,150 A | 10/1991 | Swanson et al. ............ 359/152 |
| 5,257,285 A | 10/1993 | Thorp ........................ 375/11 |
| 5,257,405 A | 10/1993 | Reitberger ................ 455/54.1 |
| 5,329,395 A | 7/1994 | Endo et al. ................. 359/159 |
| 5,475,520 A | 12/1995 | Wissinger ................... 359/172 |
| 5,532,858 A * | 7/1996 | Hirohashi et al. ............ 398/57 |
| 5,631,653 A | 5/1997 | Reedy |
| 5,737,690 A | 4/1998 | Gutman ..................... 340/7.54 |
| 5,877,490 A | 3/1999 | Ramer et al. ............ 250/206.1 |
| 5,983,068 A | 11/1999 | Tomich et al. |
| 5,999,299 A | 12/1999 | Chan et al. ................. 359/172 |
| 6,049,593 A | 4/2000 | Acampora |
| 6,070,051 A | 5/2000 | Astrom et al. ............. 455/12.1 |
| 6,104,981 A | 8/2000 | Louis et al. .................. 702/5 |
| 6,297,897 B1 | 10/2001 | Czichy et al. .............. 359/172 |

(Continued)

FOREIGN PATENT DOCUMENTS

GB  2111270  6/1983

OTHER PUBLICATIONS

Jungnickel, V., et al., "Wireless Infrared Communication using Adaptive Arrays", *4th ACTS Mobile Summit*, vol. 2; Sorrento, Italy, (1998),979-984.

(Continued)

*Primary Examiner*—Shi K. Li
(74) *Attorney, Agent, or Firm*—Christie, Parker & Hale, LLP

(57) ABSTRACT

A digital data network uses network nodes incorporating infrared transceivers. Each node includes a plurality of infrared transceivers having transmitter and receiver optics designed to facilitate line-of-sight infrared optical communications in a residential or business neighborhood. New nodes are installed with at least one selected transceiver having line-of-sight access to at least one existing transceiver. Automated tracking and acquisition processes are used to align transceivers to enable data communication and to acquire newly installed nodes into the network.

Other automated tracking programs operate on an as-needed or scheduled basis to maintain good alignment and communications between adjoining node transceivers.

Network nodes include weather-proof housings and are of a size and shape to be easily mounted on existing structures so as not to disrupt the visual appeal of a neighborhood.

19 Claims, 23 Drawing Sheets

U.S. PATENT DOCUMENTS

| | | |
|---|---|---|
| 6,314,163 B1 | 11/2001 | Acampora |
| 6,323,980 B1 | 11/2001 | Bloom |
| 6,469,815 B1 * | 10/2002 | Poon et al. ............ 398/131 |
| 6,650,451 B1 * | 11/2003 | Byers et al. ............ 398/129 |
| 6,658,214 B1 * | 12/2003 | Ito ....................... 398/120 |
| 2002/0005972 A1 | 1/2002 | Bloom et al. |
| 2002/0051269 A1 | 5/2002 | Margalit et al. |
| 2002/0054411 A1 | 5/2002 | Heminger et al. ....... 359/159 |
| 2002/0054413 A1 | 5/2002 | Shivnan ................. 359/172 |
| 2003/0067657 A1 * | 4/2003 | Dimmler et al. ......... 359/159 |

OTHER PUBLICATIONS

Pakravan, M.R., et al., "Indoor Wireless Infrared Channel Characterization by Measurements", *IEEE Transaction*, vol. 50, Issue 4, (Jul. 2001),1053-1073.

Yoon, T., et al., "622 Mbit/s CMOS limiting amplifier with 40dB dynamic range", *Electronics Letters*, vol. 32, No. 20, (Sep. 26, 1996),1920-1922.

* cited by examiner

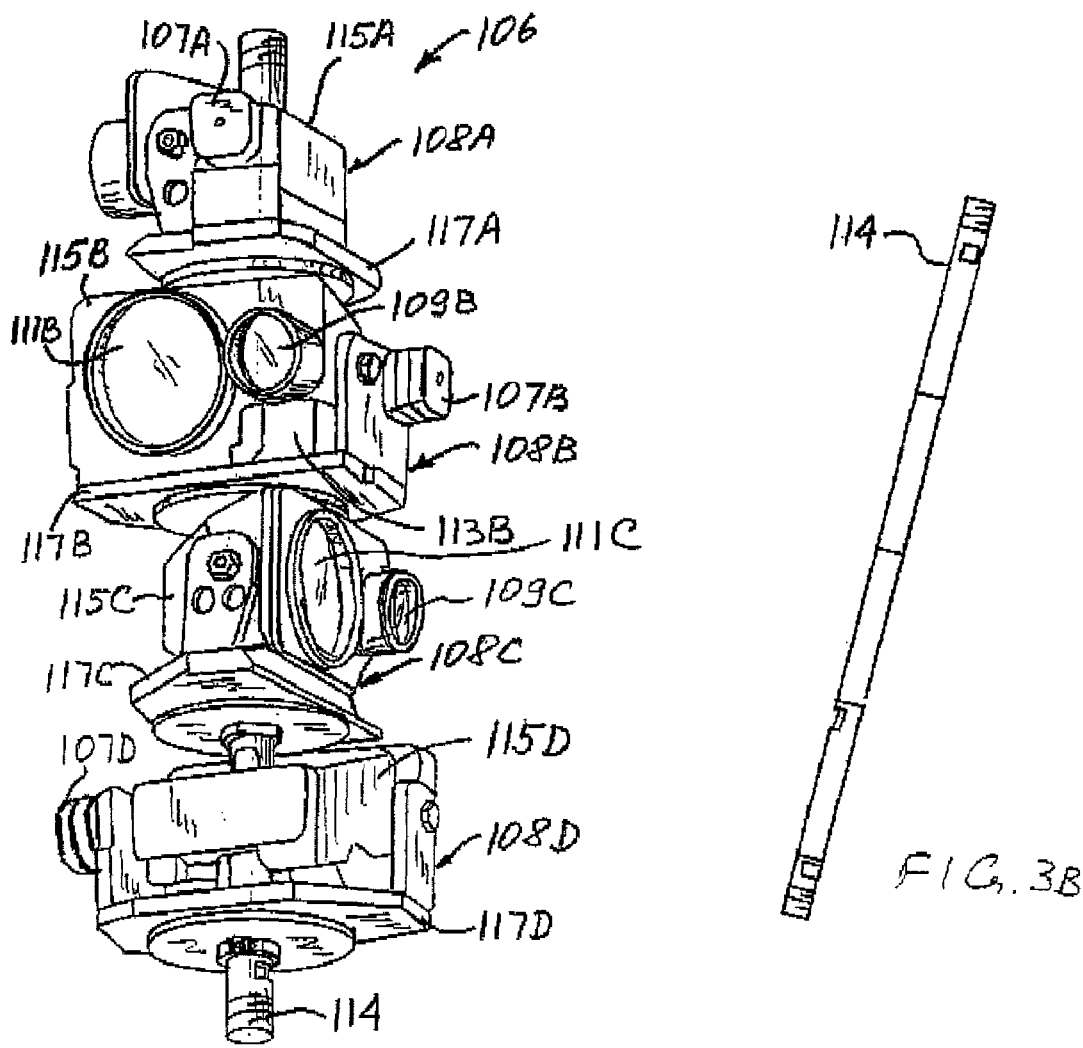
FIG. 3A
FIG. 3B
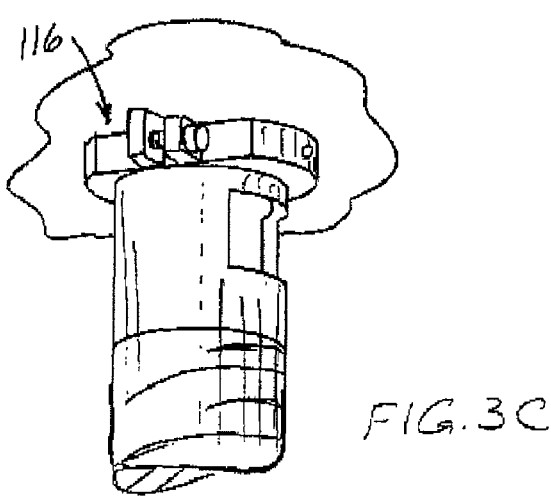
FIG. 3C

METHODS AND SYSTEMS FOR ALIGNING AND MAINTAINING ALIGNMENT OF POINT-TO-POINT TRANSCEIVERS IN A NETWORK

CROSS-REFERENCE TO RELATED APPLICATIONS

This application is related to U.S. application Ser. No. 10/162,541 titled: WIRELESS INFRARED NETWORK TRANSCEIVER by Moursund, C. M., Ulmer, C. T., Hakakha, H., Chiu, J. and Adhikari, P. filed on same date herewith.

FIELD OF THE INVENTION

The present invention relates generally to wireless transceivers and more particularly to methods and systems for aligning and maintaining the alignment of wireless transceivers.

BACKGROUND OF THE INVENTION

In many areas of the world the World Wide Web (WWW), or Internet, has become a significant medium for the exchange of information including everything from casual electronic mail (e-mail) to legal and business documents to entertainment media. Much of the material exchanged over the Internet comprises very large electronic files, for example large documents, music, video and even full-length motion pictures are available for exchange and distribution over the Internet.

While commercial services often choose fast but expensive high-speed Internet connections for business purposes, typical consumer connections comprise relatively slow telephone modems. For example, a typical commercial T1 connection will yield in the range of 1,544 kilobits per second (Kbps) or 1.544 megabits per second (Mbps) data communications rate at a monthly cost in the range of $1,000 to $2,000. In contrast, a typical consumer telephone modem connection will provide a 56 Kbps data communications rate at a cost of in the range of $10–$30 month.

As commercial services provide richer content for consumer use, data file sizes increase. For example, a typical audio music file may be in the range of 3–5 Megabytes and take up to 10 minutes for a consumer to download over a telephone modem. A typical audio/video file, for example a full-length movie, may run in the thousands of mega bytes size range and take a significant part of a day for a consumer to download over a modem. Streaming audio or video may require the download of large quantities of data over an extended period of time.

It is obvious that the ability of commercial services to provide rich, large media files is rapidly outstripping the typical consumer's ability to receive those files.

Recently, several affordable, high-speed alternatives have become available to the traditional consumer telephone modem. Cable modems use the cable television infrastructure to provide Internet connections having a speed of about 1,100 Kbps, about 20× times the speed of a telephone modem. DSL modems use conventional telephone lines to provide Interconnect connections, and have an average speed of about 700 Kbps, or over 12× times the speed of a telephone modem. Both cable and DSL modems are priced at approximately twice the cost of telephone modem services, with slightly higher equipment costs than for standard modems.

The higher speed cable and DSL connections are geographically limited, however, by the underlying infrastructure. Many areas of the United States and worldwide include regions not serviced by cable television or where the cable television networks have not and will not be upgraded to support high-speed data modems. Similarly, DSL service is not available in many geographic areas. Numerous reasons exist for the limited availability of cable and DSL services, including high cost of infrastructure upgrade, technological limitations, physical geographical limitations and, in some areas, low demand. As with many types of commercial services, the incremental costs of extending infrastructure are becoming increasingly higher, sometimes by multiples or even exponentially, as attempts are made to expand those infrastructures to every last consumer.

There thus exists a real demand for high-speed Internet connections in areas that cable and/or DSL service providers may never serve. This demand will increase as more content is provided and more business is executed over the Internet.

Some providers have attempted to expand service coverage while avoiding the high costs associated with expanding network infrastructure. This is typically accomplished using a wireless network, for example extending from an access point in the wired infrastructure. Wireless networks may be installed without the need for the wired infrastructure.

One type of wireless network uses wireless radio frequency (RF) components that transmit data in the radio frequency spectrum. These networks, however, have the disadvantages of being expensive and relatively slow. In one embodiment of multi-channel multipoint distribution system (MMDS), for example, broadcasts occur at speeds up to 25 Mbps but require very expensive spread-spectrum infrastructure equipment, costing on average $16 million. MMDS customer equipment is also very expensive, with the cost of deployment for a single customer running in the range of $1,000.

Wi-Fi, or 802.11b is a much lower speed technology; achieving throughputs of up to 5.5 Mbps full duplex. Wi-Fi bandwidth decreases significantly with distance between components, and is particularly dependent on obstructions such as roofs or walls, as well as interference from other networks or even microwave ovens.

Another type of wireless network uses light, in the form of, for example, lasers or light-emitting diodes (LEDs) to transmit high-speed data in a process called free space optic systems, or FSO systems. While FSO systems are a cost-effective high-speed communications medium, they require very highly aligned line-of-sight paths. More specifically, existing free space optic systems have very narrow beam divergence parameters requiring precision alignment. For this reason, laser and FSO components tend to be expensive and require high levels of maintenance and service.

There thus exists demand for high-speed, affordable Internet connections in geographies and neighborhoods into which more traditional, wired high-speed network infrastructure cannot be cost-effectively extended. This demand will grow significantly as the Internet is increasingly used to deliver content, facilitate business transactions and support other matters amenable to electronic data transfer.

SUMMARY OF THE INVENTION

The present invention uses networked, wireless infrared nodes to cost-effectively provide high-speed data capacity, including Internet access, to selected geographies and neighborhoods. While not thus limited, the network of the present invention can be cost-effectively extended to many areas not supporting traditional wired network infrastructure.

In accordance with one embodiment of the invention there is provided a system and method of installing a new point-to-point communications transceiver in a network of existing point-to-point communications transceivers, the method comprising the steps of: positioning a new transceiver in a line of sight to at least one existing transceiver; positioning the new transceiver to point in a predetermined compass direction; at a predetermined time, the new transceiver performing a first sweep over a first predetermined range to detect a signal from the existing transceiver; at the predetermined time synchronously with the new transceiver, the existing transceiver performing a second sweep over a second predetermined range to detect a signal from the new transceiver; upon the completion of the first sweep of the new transceiver, the new transceiver returning to a position of maximum detected signal strength; and upon the completion of the second sweep of the existing transceiver, the existing transceiver returning to a position of maximum detected signal strength.

In accordance with another embodiment of the invention there is provided a system and method of maintaining the alignment of first and second communicating transceivers in a network of existing point-to-point communications transceivers, the method comprising the steps of: monitoring the signal strength received by the first transceiver; monitoring the signal strength received by the second transceiver; if either of the signal strength received by the first transceiver or the signal strength received by the second transceiver falls below a predetermined threshold, then with the second transceiver stationary, tracking the first transceiver over a first predetermined path to determine a position of maximum signal strength detected by the first transceiver in the first predetermined path, after the completion of the tracking of the first transceiver, returning the first transceiver to the position of maximum signal strength detected by the first transceiver in the first predetermined path, with the first transceiver stationary, tracking the second transceiver over a second predetermined path to determine a position of maximum signal strength detected by the second transceiver in the second predetermined path, and after the completion of the tracking of the second transceiver, returning the second transceiver to the position of maximum signal strength detected by the second transceiver in the second predetermined tracking path.

DESCRIPTION OF THE DRAWING FIGURES

These and other objects, features and advantages of the invention will become apparent from a consideration of the Detailed Description of the Invention when read in conjunction with the drawing figures, in which:

FIG. 3A is a perspective view of the network node without the cover;

FIG. 3B is a perspective view of the central shaft of the network node;

FIG. 3C is a perspective view of the mechanical coupler for coupling the infrared transceiver to the central shaft;

Figure 15A:
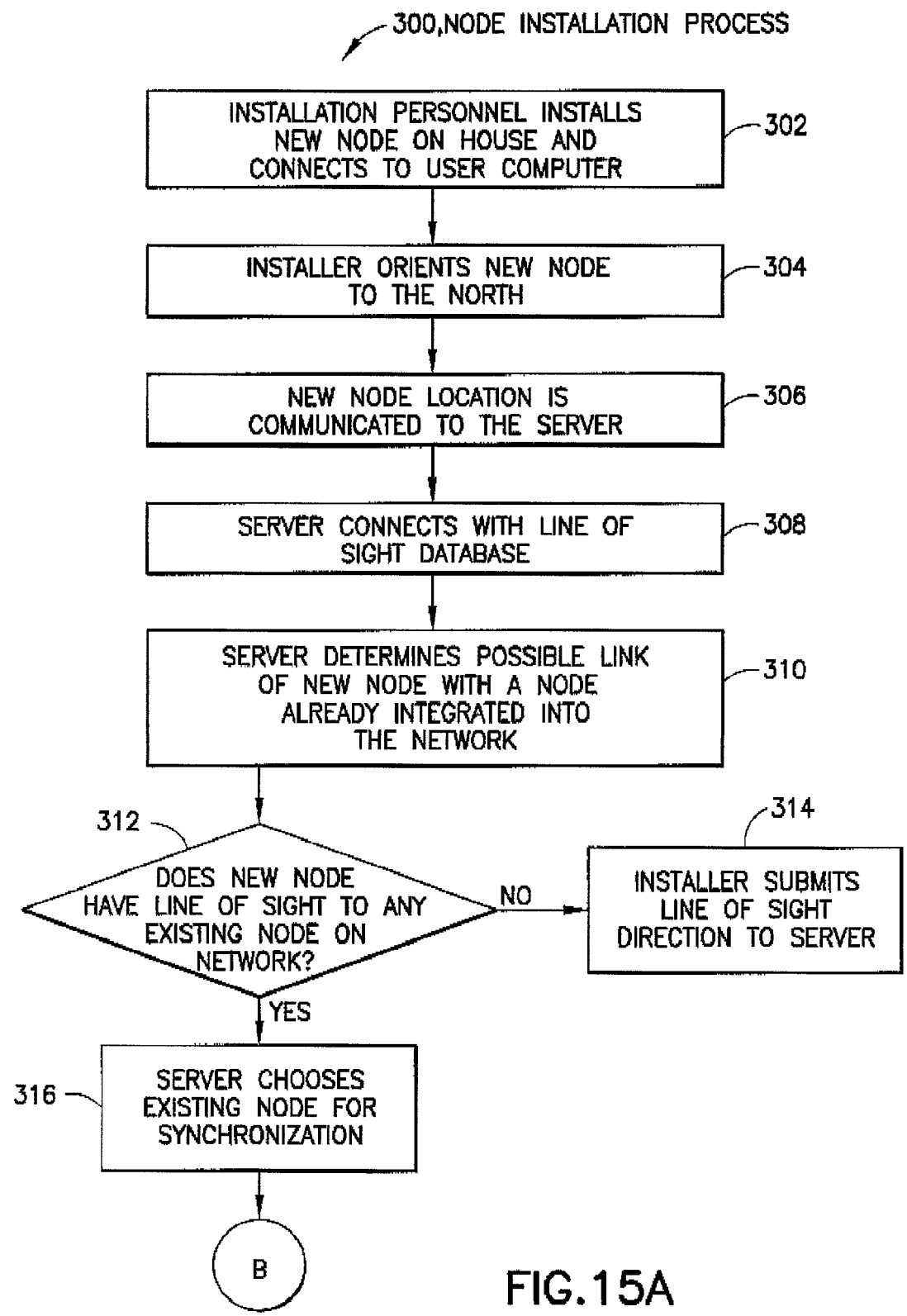
Figure 15B:
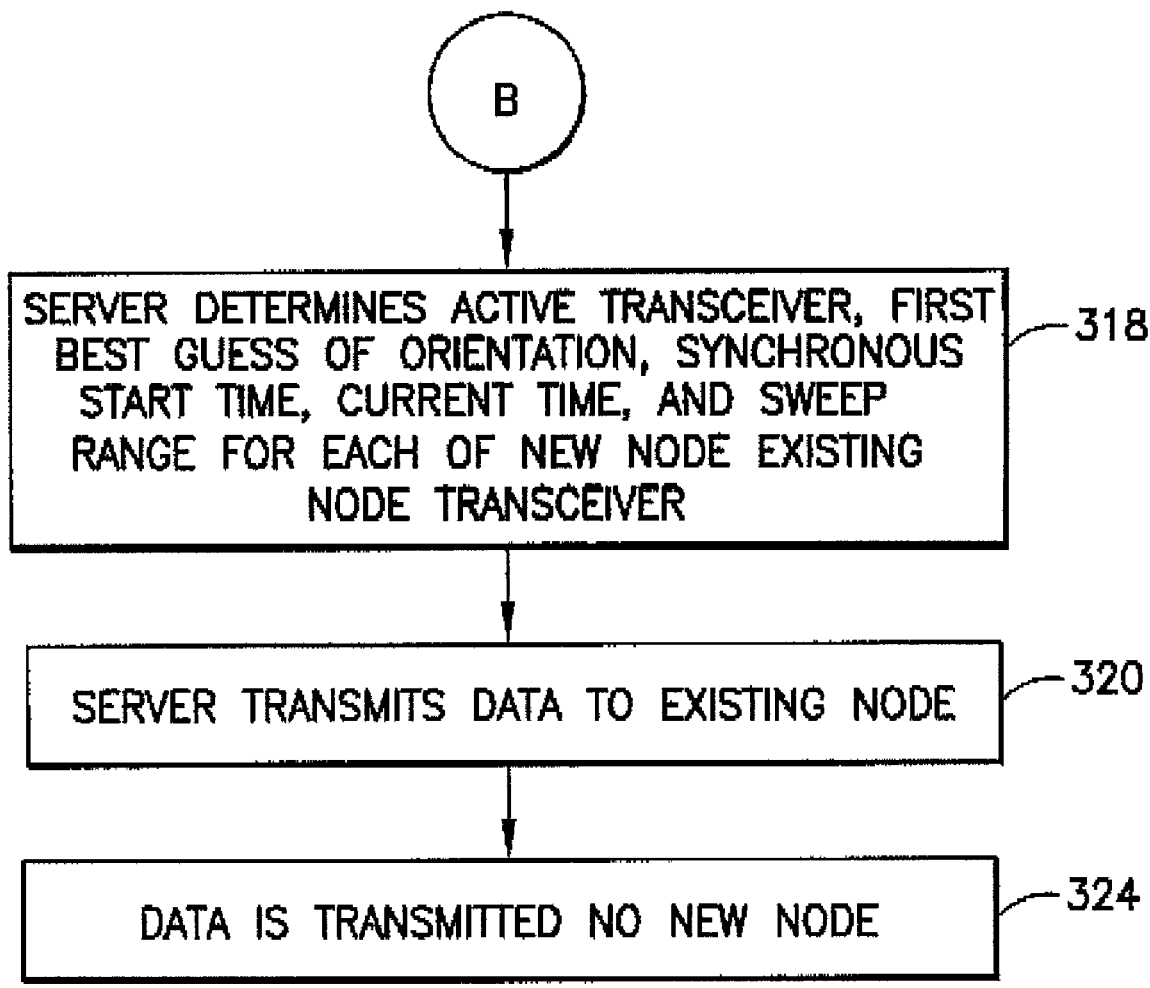
Figures 1, 16A:
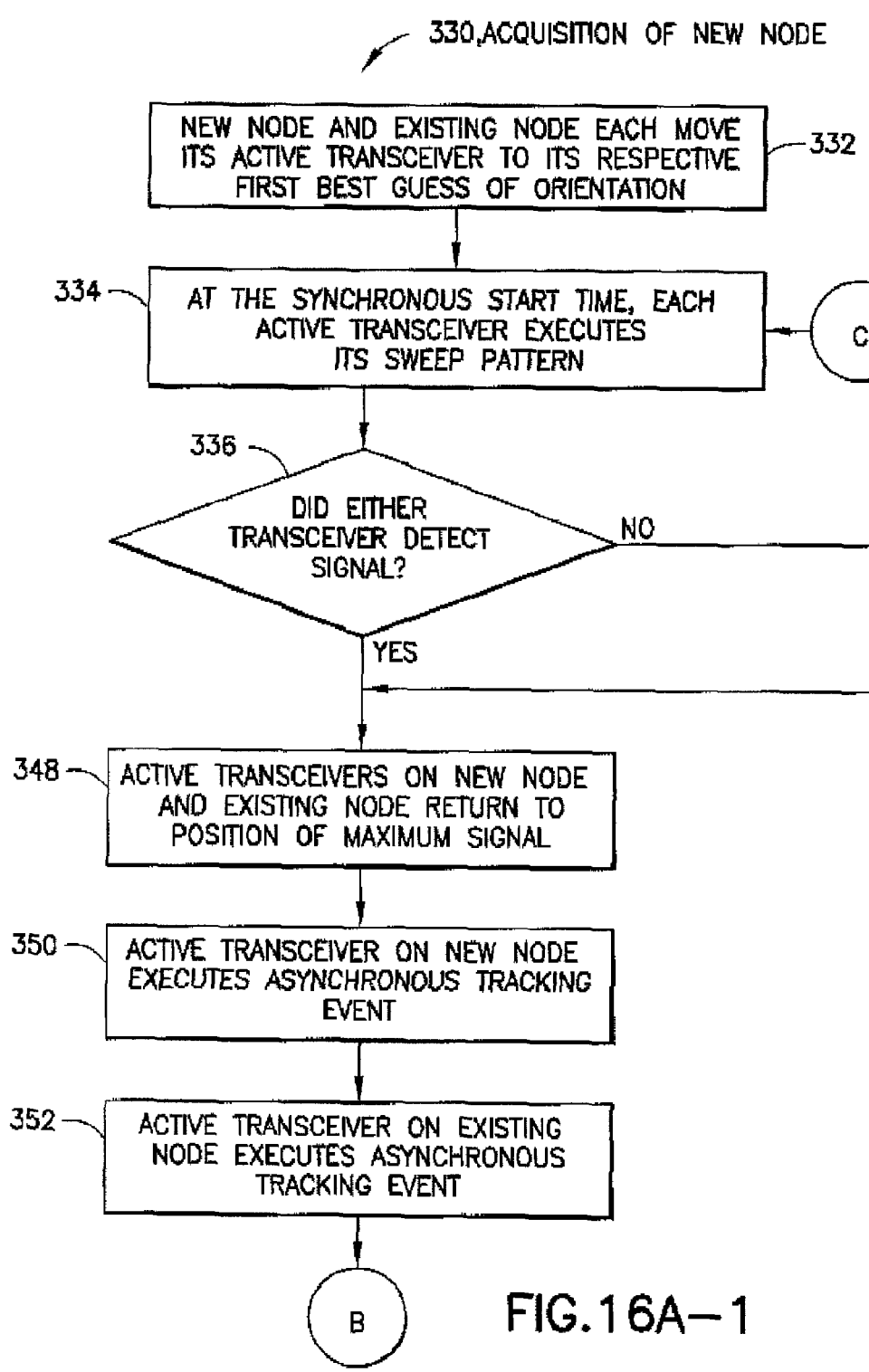
Figure 16A:
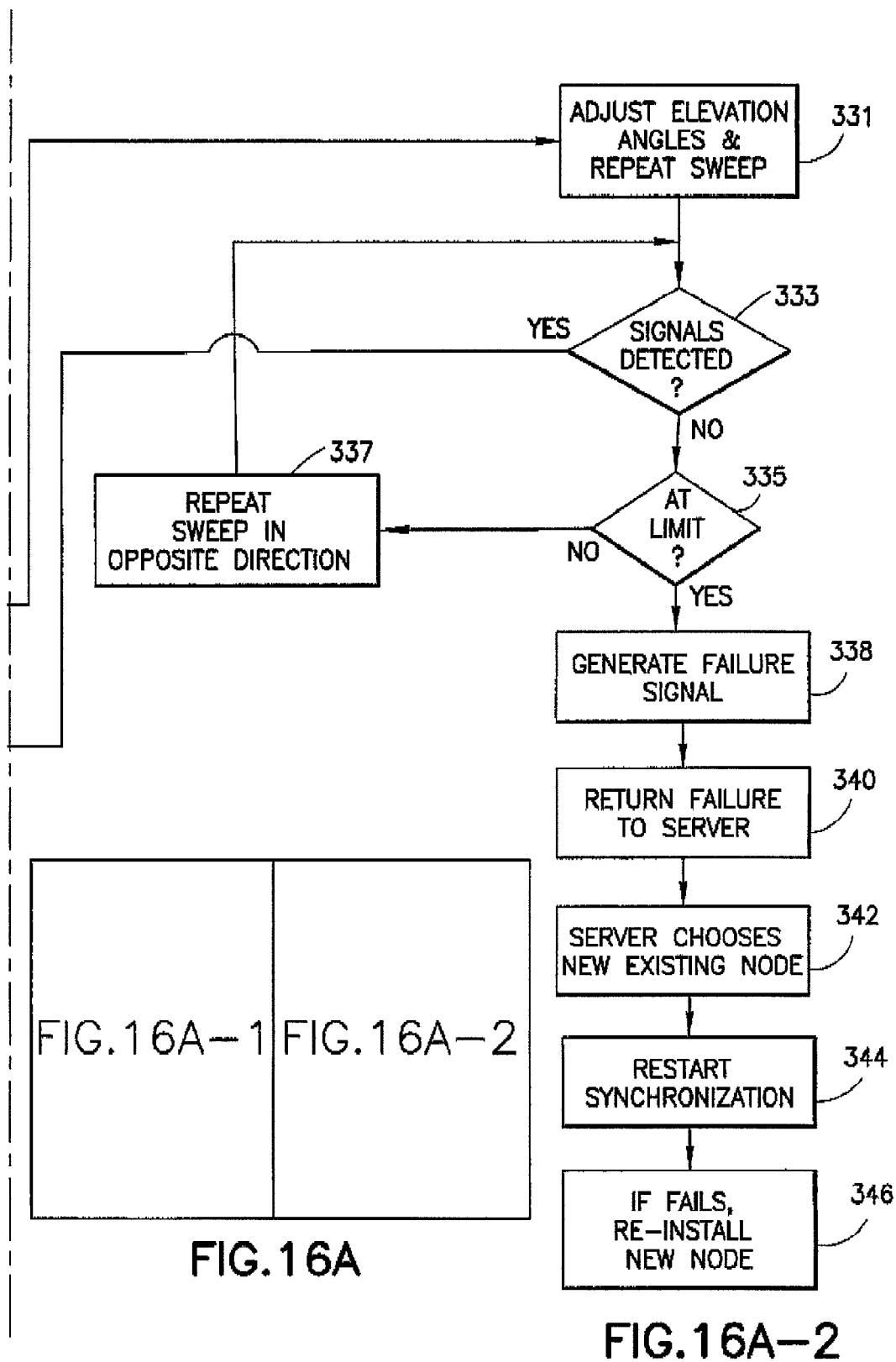
Figure 16B:
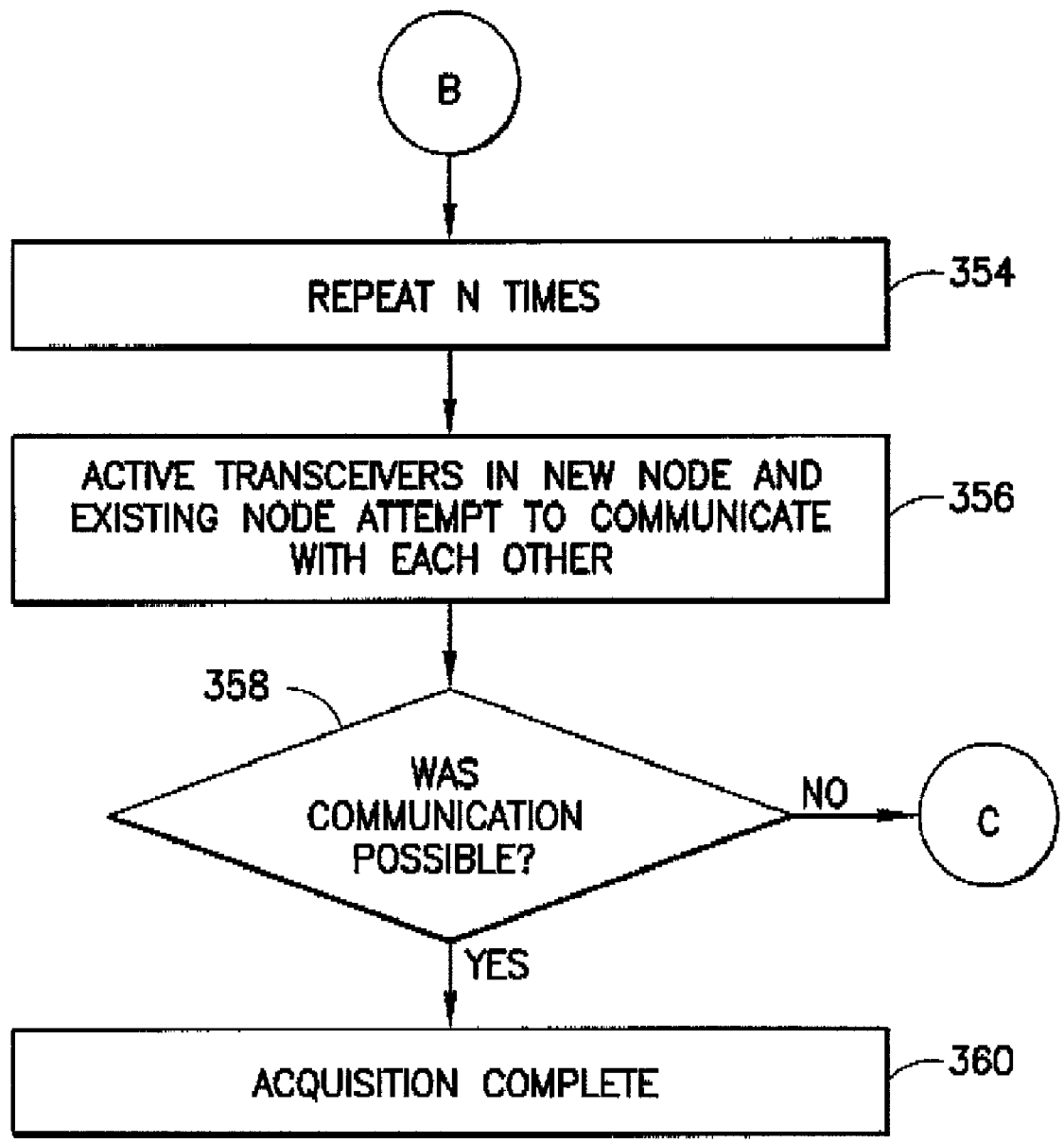
Figure 17:
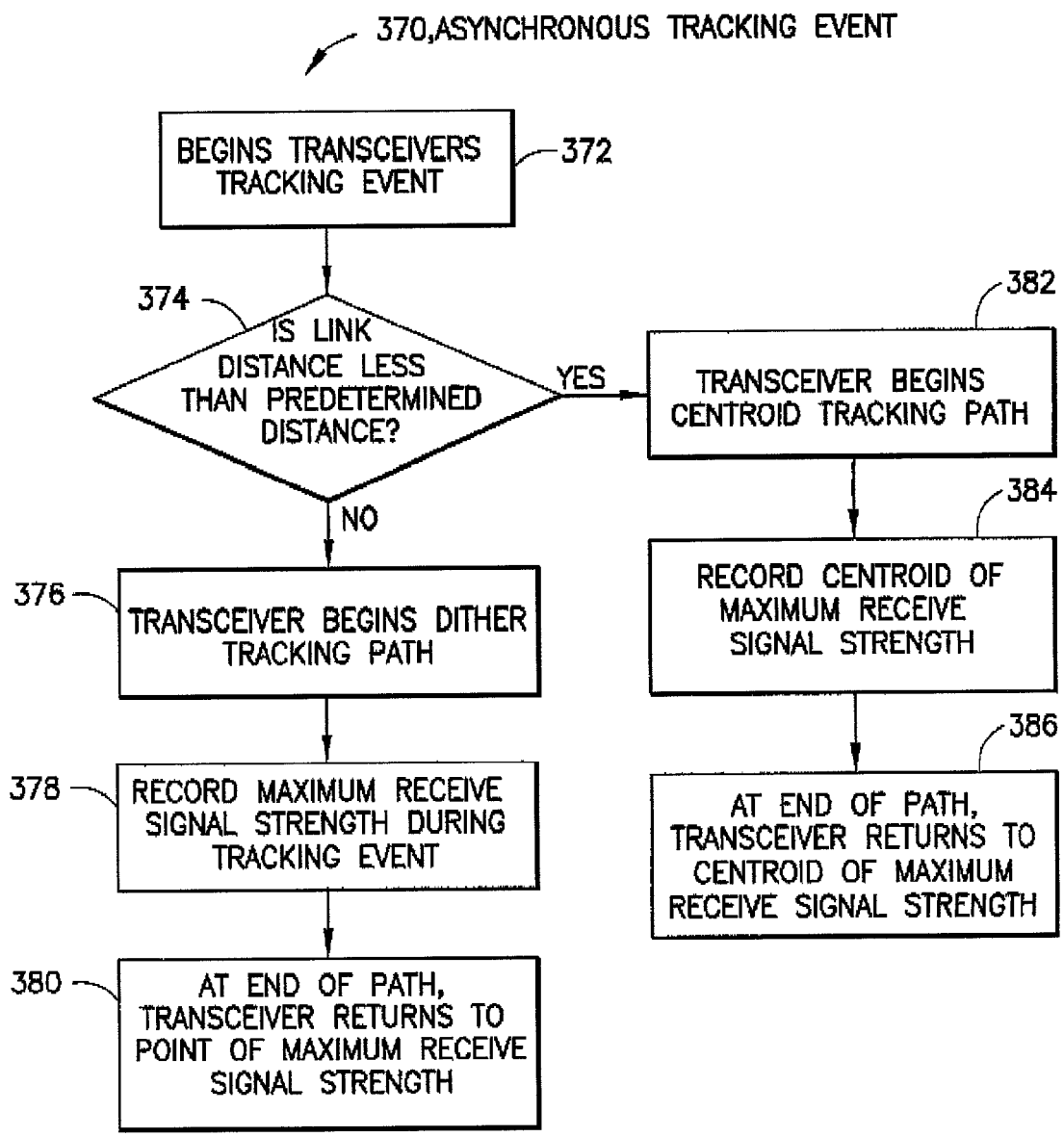
Figure 18:
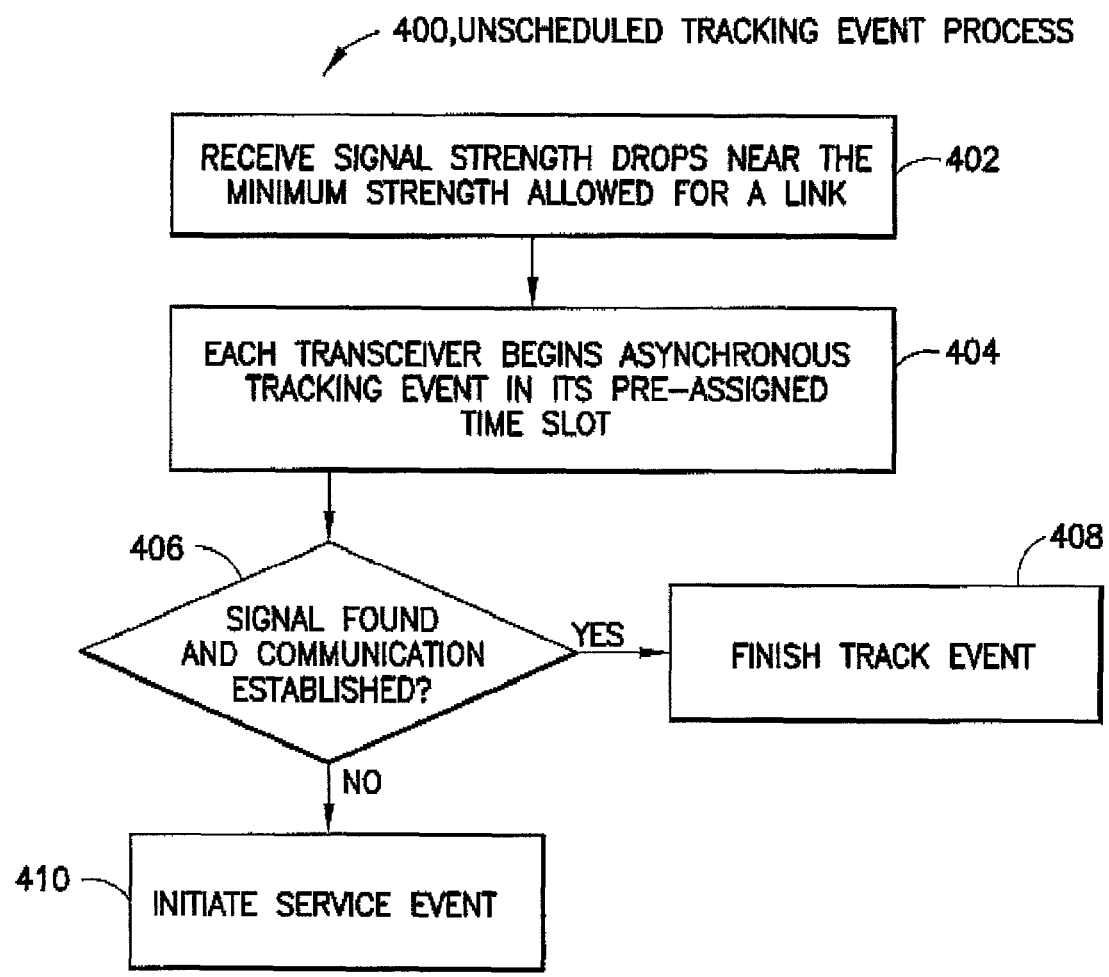

FIGS. 15A and 15B together show a process for installing a new node into an existing network;

FIGS. 16A and 16B together show a process for the auto-acquisition of a newly installed node into an existing network;

FIG. 17 shows a process for asynchronously initiating and executing a transceiver tracking process; and FIG. 18 shows a process for initiating and executing an unscheduled transceiver tracking process.

DETAILED DESCRIPTION OF THE INVENTION

With reference now to the drawing Figures, embodiments of the invention are shown and described wherein like elements are indicated by like reference numerals throughout.

Network Node

Figure 1:
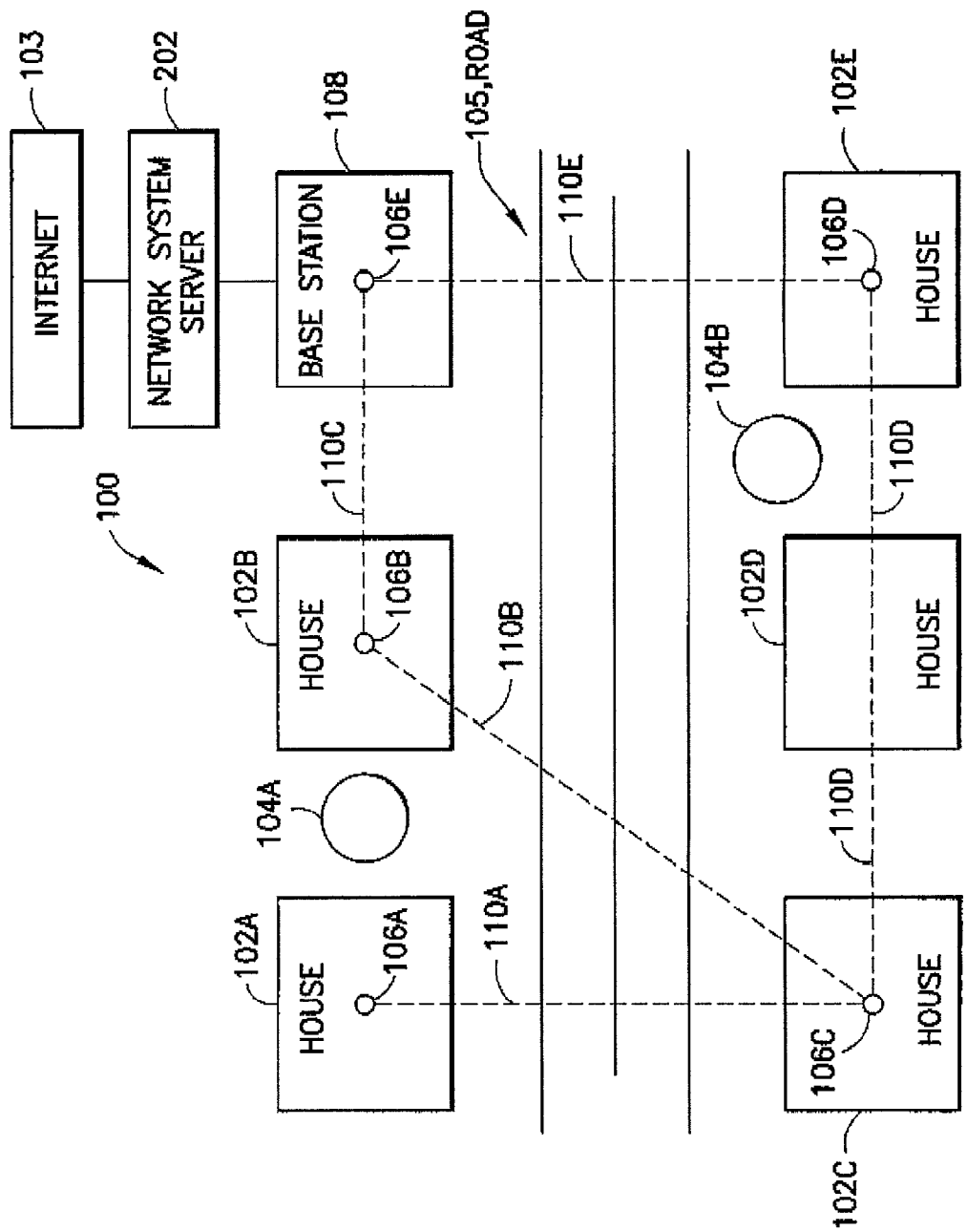
FIG. 1 is a diagrammatic view of an infrared wireless mesh network in accordance with the invention.

With reference first to FIG. 1, a diagram of a residential neighborhood 100 is shown including multiple houses indicated at 102A-E. As is typical in neighborhoods, trees or other natural obstacles exist, indicated at 104A&B, which may block lines of sight between adjoining houses. A road 105 transects neighborhood 100 in a conventional manner. In accordance with the present invention, a series of infrared network nodes, indicated at 106A-E, are positioned on the upper, outer surfaces of the homes, for example the roofs. It will be seen that house 102D has elected not to receive services from the described network and so no network node is positioned on that house.

Network node 106E is positioned on a base station 108, typically comprising a neighboring building or cell tower with access to a traditional wired network. In one embodiment of the invention, the base station 108 comprises a network system server 202 or a set of network of servers. Network system server(s) 202 provides network control and management features in a manner described below. Network system server may also provide any other network services to each node, such as entertainment and caching services. The traditional wired network connects the base station 108 to the Internet through network system server(s) 202. In another embodiment of the invention, the wired network connection provides an access to a remote facility or facilities comprising one or more network system servers and a connection(s) to the Internet.

As is described in further detail below, other communications paths such as telephone dial-ups or local RF networks can be used for communication of various control and alignment data during local network set-up and maintenance processes.

Within neighborhood 100, various lines of sight between adjacent network nodes are indicated by dotted lines 110A-E.

In operation, network nodes 106A-D are configured in a mesh network configuration. High-speed digital data, in the form of Internet Protocol (IP) packet data, is transmitted between adjoining nodes, in the manner described below. As in a conventional IP packet-switching network, each network node examines the IP data and makes a routing decision based on the IP parameters. The present embodiment is illustrated as connected to the Internet, but the invention is not thus limited and is equally applicable, for example, to implement a private local or wide area network. There is thus provided a high-speed, digital data, IP packet-switching network using cost-effective, flexibly positioned network nodes 106A-D. While the network nodes have been illustrated in a mesh network relationship, it will be understood that they would similarly function in alternate network structures, including point-to-point networks and others. It will further be understood that while network nodes are specified to use IP protocol for data packet switching, they would similarly function with alternate networking protocol like ATM.

Figure 2A:
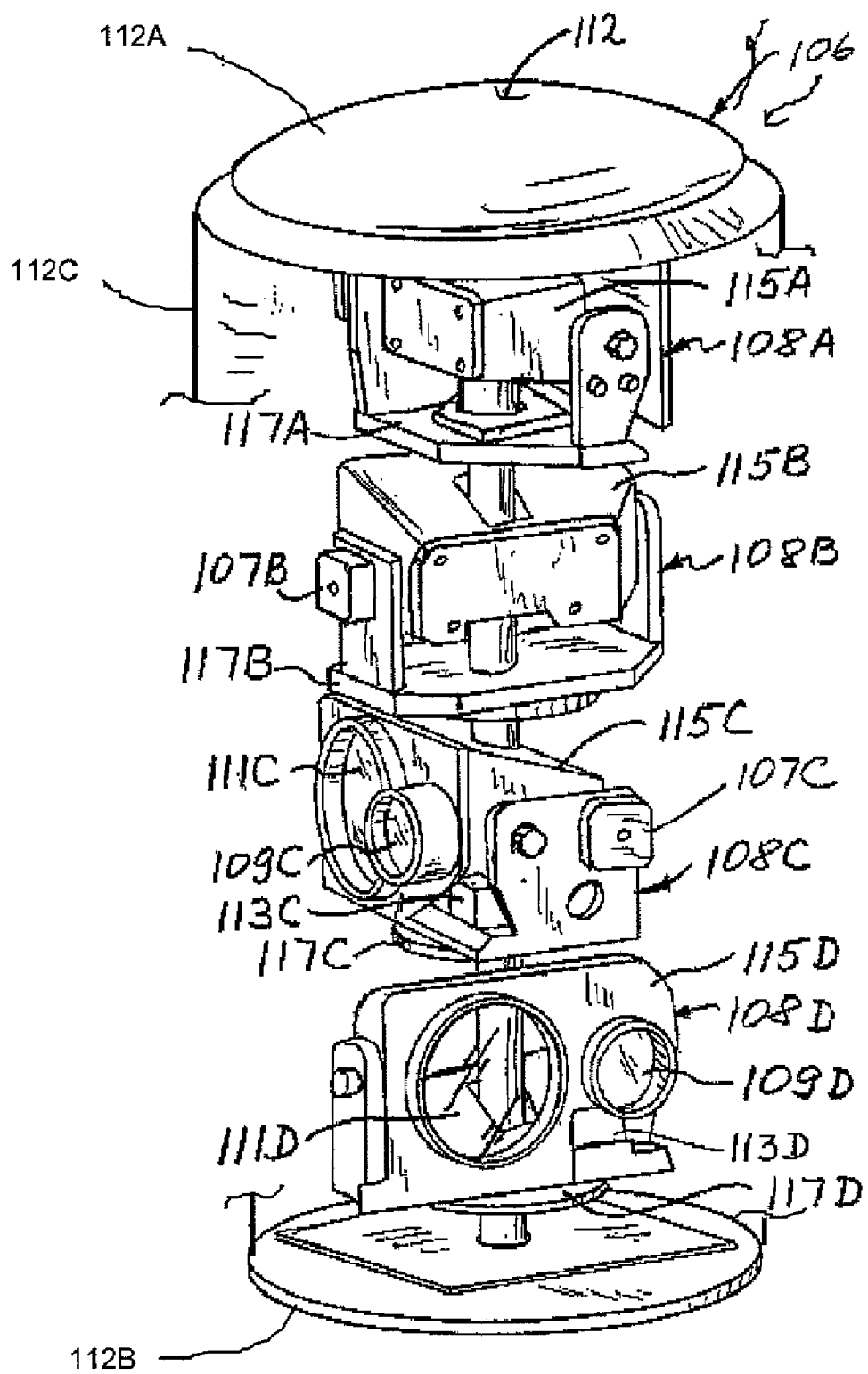
FIG. 2A is a perspective view of a network node in accordance with the present invention.
Figure 2B:
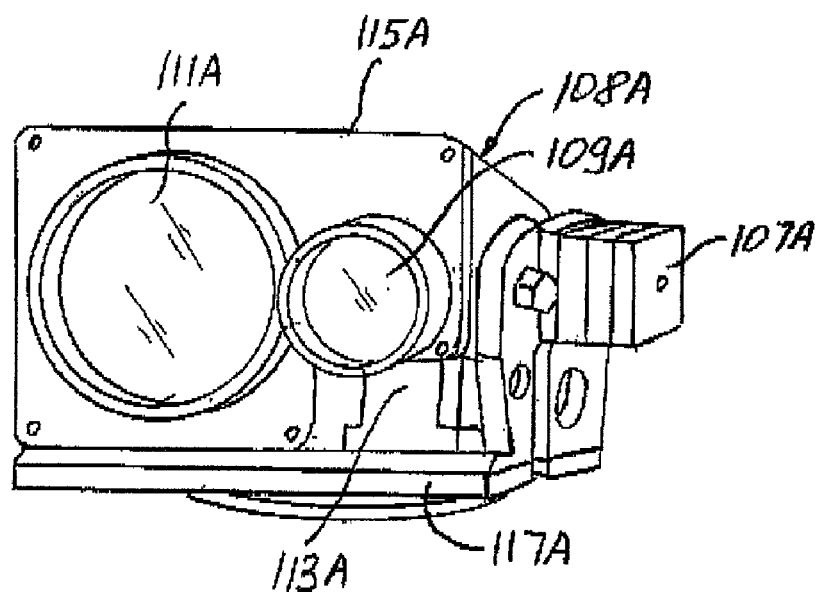
FIGS. 2B and 2C are front and rear perspective views, respectively, of an infrared transceiver from a network node.
Figure 2C:
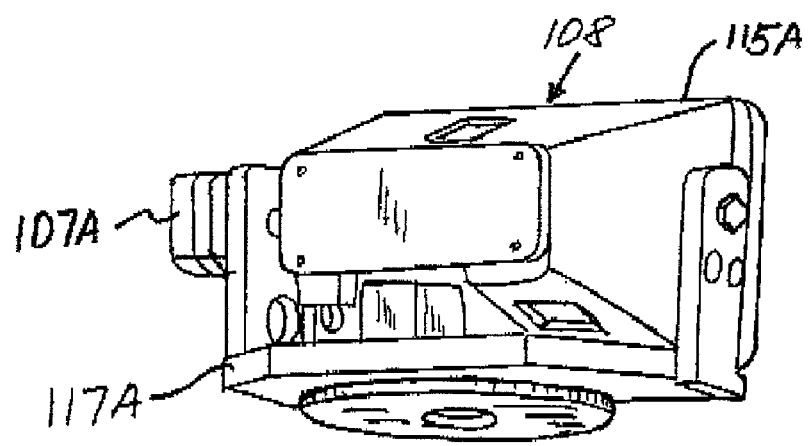

Referring now to FIGS. 2A, B and C, there is shown an exemplary network node 106 containing four mechanically and electrically connected infrared transceivers, indicated at 108A-D. Each transceiver is seen to include a respective transmitter lens 109A-D, receiver lens 111A-D, elevation motor 107A-D and azimuth motor 113A-D. Each transceiver includes a mount 115A-D for supporting the transceiver optics, and a base 117A-D about which the mount with optics can rotate both horizontally and vertically. As described in further detail below, in each transceiver the motors are connected between the optics mount and the transceiver base for rotating the mount with optics relative to the base. A weatherproof housing 112 encloses the infrared transceivers, providing weatherproof access for electrical connections thereto in a manner described in further detail below. Weatherproof housing 112 includes a top 112A, a bottom 112B and a plastic tube or sleeve 112C (shown cut away) enclosing the internal devices, the plastic sleeve selected from a material transparent to infrared light. An exemplary sole infrared transceiver 108A is illustrated in FIGS. 2B and 2C.

It will be understood that, excepting for position, nodes 106A-E are substantially identical, as are the transceivers 108A-D within the nodes. Thus, any description of the mechanical, electrical and/or optical structure of a particular node or transceiver is applicable to substantially all nodes and transceivers.

Referring now to FIG. 3A, network node 106 is shown with weatherproof housing 112 removed. Infrared transceivers 108A-D can be seen to be generally concentrically mounted on a central shaft 114, shown in FIG. 3B, with each transceiver fixed to the shaft by a locking clasp 116 best shown in FIG. 3C. Upon initial fabrication, locking clasps 116 are used to position infrared transceivers 108A-D in known relative positions to facilitate the installation and tracking process described below. In one embodiment of the invention central shaft 114 is hollow for supporting electronic power and data cables.

It will be understood that, due to the nature of each of the figures described above, not every feature of each transceiver is visible in every figure.

Figure 4A:
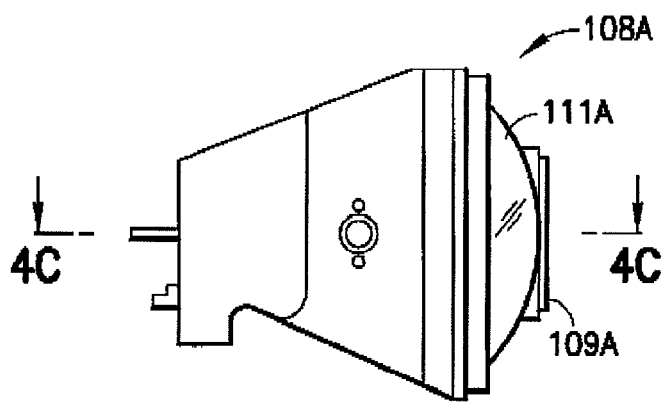
FIGS. 4A and 4B are side and front plan views of the infrared transceiver.
Figure 4B:
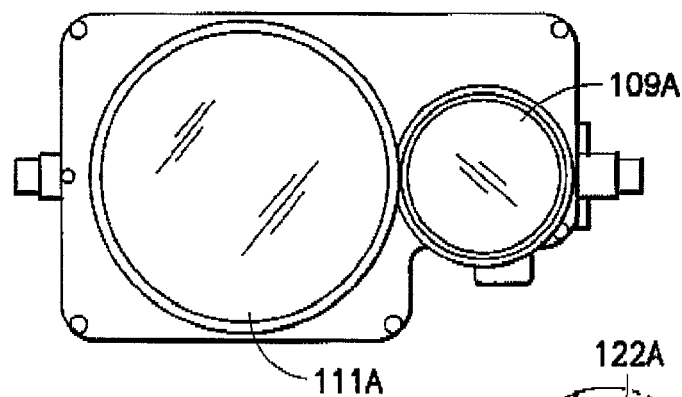
Figures 4C, 4D, 4E:
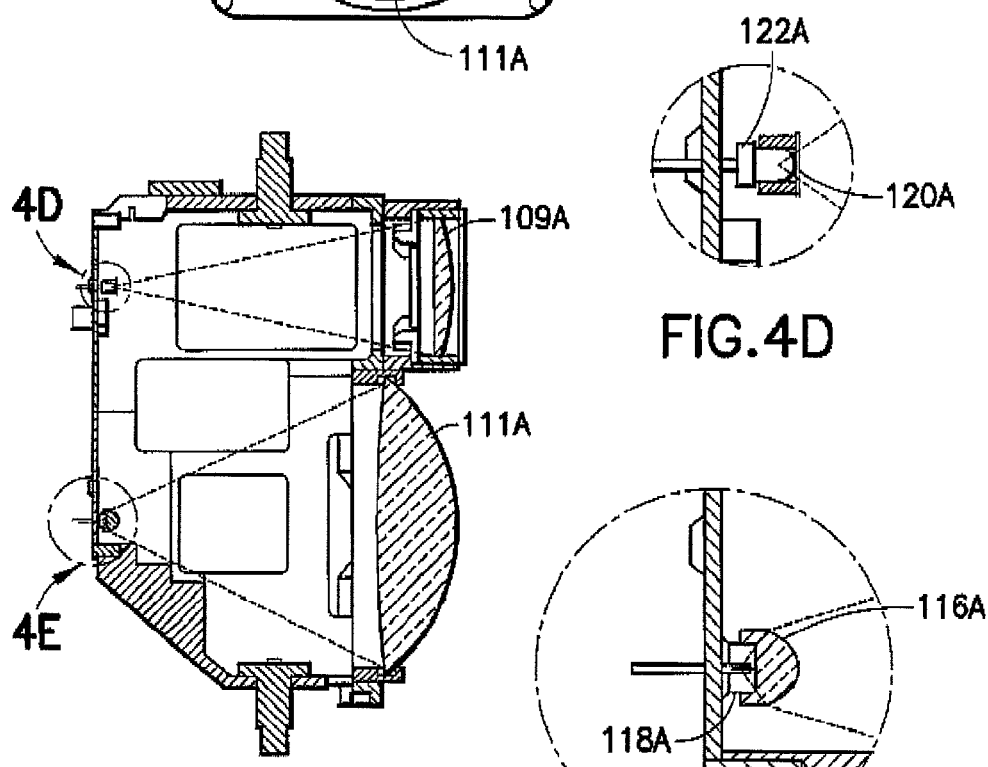
FIG. 4C is a cut view of the infrared transceiver along axis A—A of FIG. 4A.
FIG. 4D is an enlarged partial view of infrared transmitter elements of FIG. 4C.
FIG. 4E is an enlarged partial view of infrared receiver elements of FIG. 4C.

With reference now to FIGS. 4A, B, C, D and E, additional features of exemplary transceiver 108A are seen. More particularly FIG. 4D shows a light-emitting diode (LED) 122A positioned to emit light through a diffuser sheet 120A for transmission by transmitter lens 109A. LED 122A preferably contains a reflector positioned behind its active area for directing more emitted light forward through diffuser sheet 120A.

FIG. 4E shows a detector dome lens 116A positioned to partially surround an avalanche photodiode (APD) 118A for receiving light from receiver lens 111A. As will be further described below, the transmit optics including LED 122A, diffuser sheet 120A and transmitter lens 109A, and the receive optics including receiver lens 111A, dome lens 116A and APD 118A are carefully selected such to optimize the performance of both the individual infrared transceivers and the entirety of the mesh network.

Elevation motors 107A-D constitute conventional stepper motors controlled by electrical signals described below and positioned between each transceiver base and optical system mount so as to enable the individual rotation of each transceiver's transmit/receive optics in a vertical plane. Similarly, azimuth motors 113A-D also constitute conventional stepper motors controlled by electrical signals described below and positioned between each transceiver base and optical system so as to enable the individual rotation of each transceivers transmit/receive optics in a horizontal plane. Each of transceivers 108A-D thus has the capacity to position its transmitter and receiver optics completely independently of the remaining transceivers within node 106. It will be understood that conventional gear mechanisms may be used in conjunction with the elevation and azimuth motors so as to enable the motors to step in consecutively desired angular increments.

In one embodiment of the invention, the elevation and azimuth stepper motors are provided as 1.8-degree stepper motors operating at 3.3 volts with nominal 1 amp of current draw. The drive system is selected to provide +/−15 degree travel in elevation and +/−178 degree travel in azimuth. A plastic, 0.25" pitch diameter pinion attached to the motor shaft drives a 3.5" pitch diameter plastic spur gear. A 14:1 (3.5/0.25) gear ratio thus provides pointing resolution of 0.13 degrees (1.8/14). In another embodiment of the invention, pointing resolution can be further increased by halfstepping the motors or by using 0.9° stepping motors. It will be understood that numerous other motor/gear embodiments will function to perform the desired results.

As will be described in further detail below, electrical signals for controlling the operation of each transceiver, including the respective elevation and azimuth motors, are contained on the electronics boards associated with each network node system board and transceiver boards. Such control signals may be loaded onto the board at the factory and/or downloaded remotely from a system server once the node is physically positioned for use.

Transceiver Optics

With reference now to FIGS. 5–8, one embodiment of the transmitter and receiver optics for transceivers 108A-D is shown and described. The optics are identical in each of the transceivers. For purposes of illustration, they are described with respect to transceiver 108A.

Figure 5:
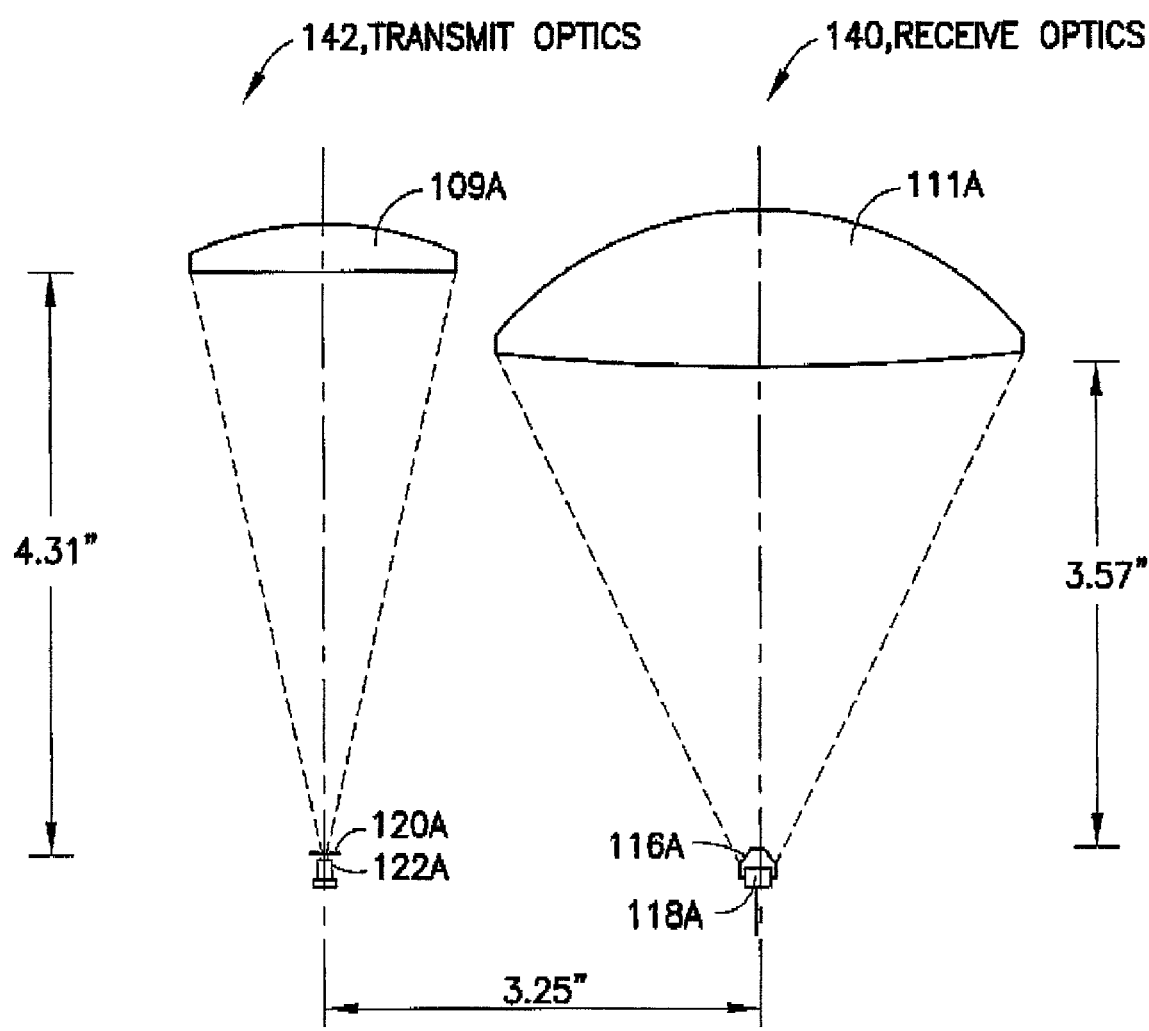
FIG. 5 is a diagrammatic view of the optical elements of the infrared optics showing the relative positioning of the receiver and transmitter optics in the transceiver casing.

Referring first to FIG. 5, the relative positioning of the receive optics 140 and transmit optics 142 is shown, with the axes of LED 122A and APD 118A seen to be spaced 3.25 inches apart. The rear surface of transmitter lens 109A is spaced 4.31 inches from the front surface of diffuser 120A, while the rear surface of receiver lens 111A is spaced 3.57 inches from the front surface of dome lens 116A. The transceiver mount 115A supports the transmit and receive components and is used to establish these dimensions.

Figure 6:
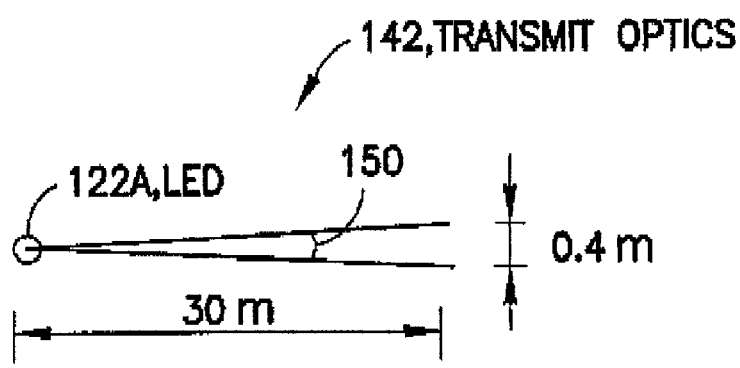
FIG. 6 is a diagrammatic view showing the optical infrared beam spread of the transmit optics of FIG. 5 at a first distance.
Figure 7:
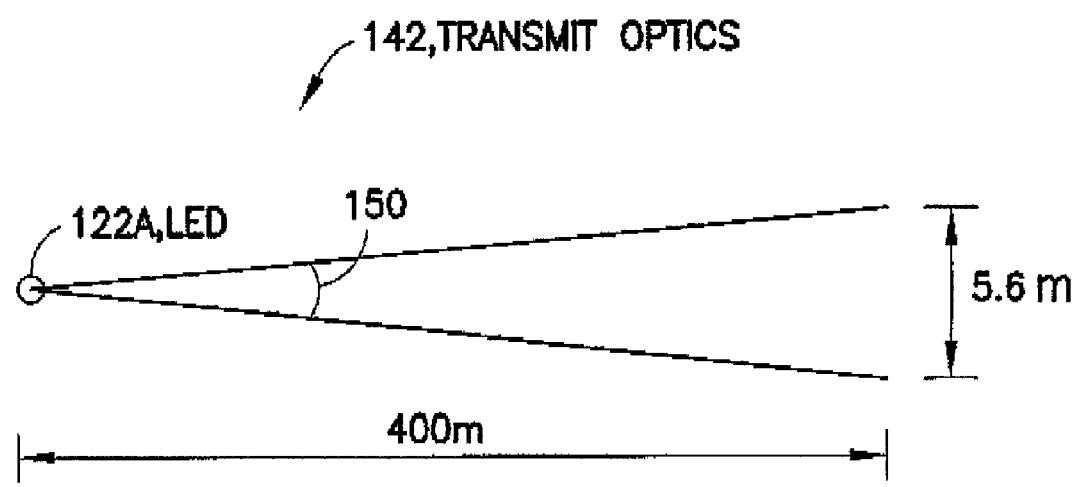
FIG. 7 is a diagrammatic view showing the optical infrared beam spread of the transmit optics of FIG. 5 at a second distance.

With reference now to FIGS. 6 and 7, the transmit optics 142 is selected to provide a 0.8 degree beam divergence, shown at 150, such that at 30 meters from LED 122A the beam diameter is 0.4 meters (FIG. 6), while at 400 meters from the LED the beam diameter is 5.6 meters (FIG. 7). In one embodiment, these characteristics can be obtained by using the relative positioning dimensions shown in FIGS. 5 and 6, and by selecting the following components having the following characteristics:

LED 122A comprises an Osram part # SFH 4301 having a wavelength of 950 nm, a standard 3 mm dome lens LED package, an angular divergence of +/−10 degrees and an active area of 300 microns.

Diffuser sheet 120A comprises a Physical Optics Corporation part #LSD5PE4-2, comprising polyester having a thickness of 0.004 inches and a Full-Width Half-Maximum angle (FWHM) of 5 degrees.

Transmitter lens 109A is a plano-convex lens manufactured from Acrylic/Polycarbonate having a focal length of 125 mm and a diameter of 50 mm.

Figure 8A:
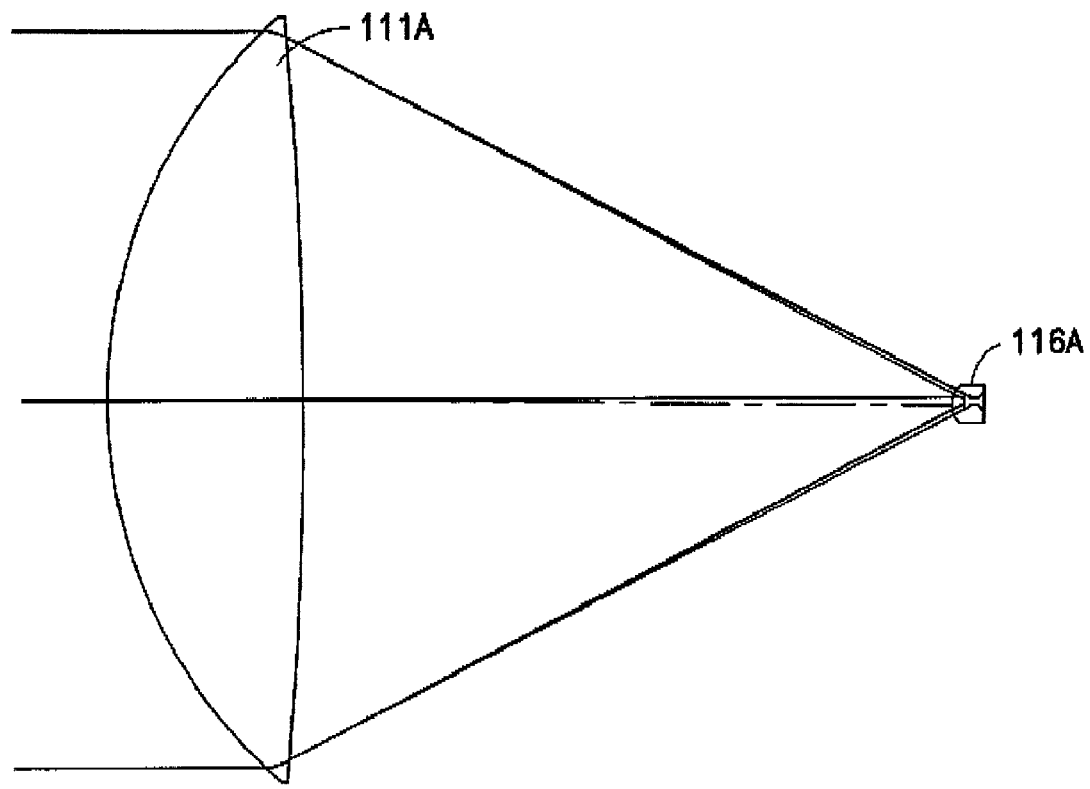
FIG. 8A is a diagrammatic view showing the optical infrared beam characteristics of the infrared receiver.
Figure 8B:
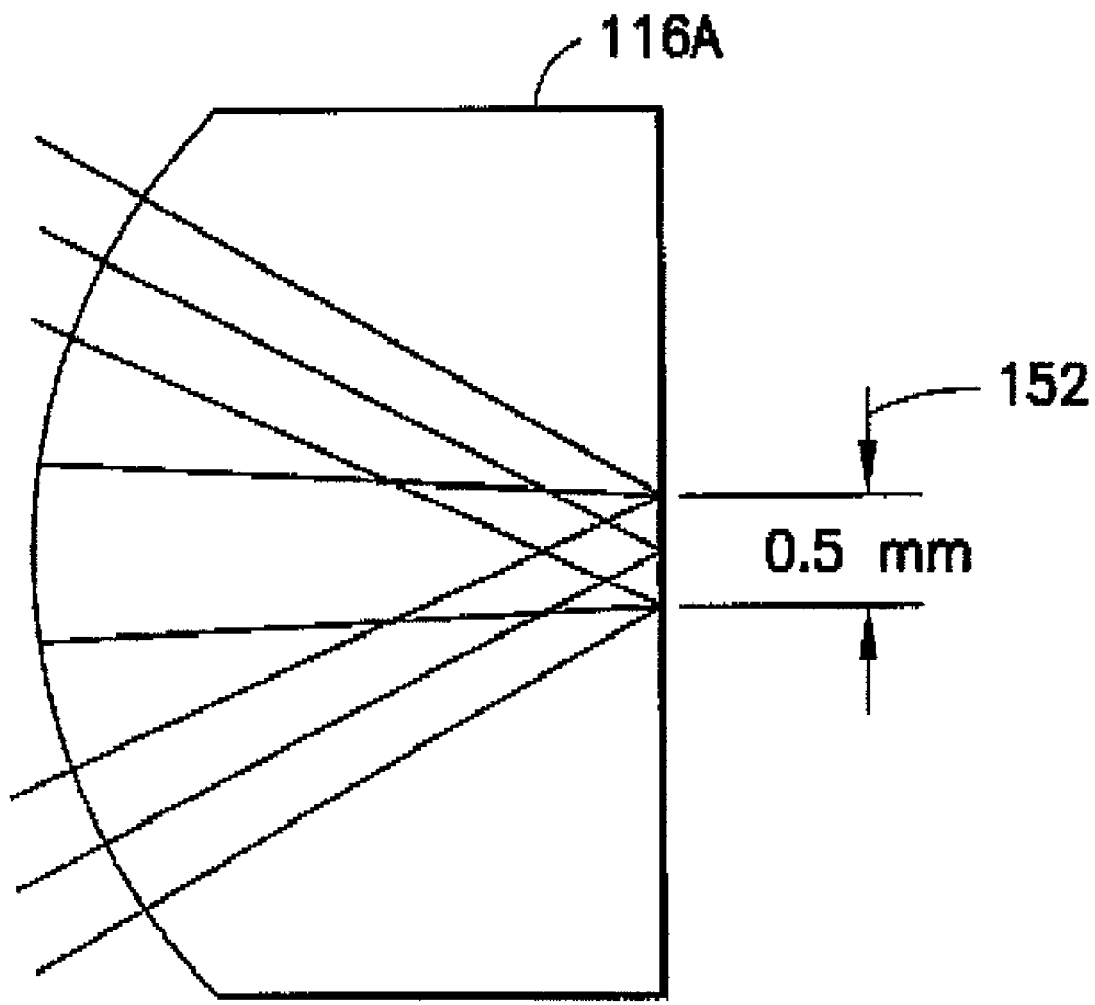
FIG. 8B is an enlarged diagrammatic view of the dome lens of FIG. 8A showing the optical infrared beam characteristics.

With reference now to FIGS. 8A–B, one embodiment of the receiving optics can be seen where receiving lens 11A and dome lens 116A are selected and relatively positioned (FIG. 8A) so as to provide a 0.5 mm beam dispersement 152 (FIG. 8B).

In one embodiment, the receiver optical components include:

APD by Hamamatsu, part # S2382, having a T048 package, an FOV of 170 degrees and an active area of 500 microns Dome lens 116A of aspheric shape and acrylic material having a focal length of 5 mm and a diameter of 7 mm Receive lens 111A of aspheric shape and acrylic material and having a focal length of 63 mm and a diameter of 100 mm A long-pass filtering dye or coating may be added to one or more of the optical elements in the receive path, for example dome lens 116A or receive lens 111A, to reduce background light of a wavelength lower than the transmission wavelengths. This will reduce the amount of visible light falling on the detector. The insensitivity of the detector to mid- and far-infrared wavelengths obviates the need to filter longer wavelengths of background light.

With these exemplary parameters and components, the received beam will be focused at APD 118A. 100% of the field coverage over 100% of the desired aperture is maintained, with the spot size at the detector being much smaller than the active area of the APD such that substantially all of the received light is detected by the APD. With a temperature change of 25 degrees centigrade, the incoming beam will still be focused to a spot that is smaller than the active area of APD 118A, thereby accommodating operating temperature-caused variations.

Thus sufficient energy is collected to operate APD 118A, both with the beam ideally positioned and with the beam shifted in accordance with the expected maximum variances.

In selecting the various parameters for the transmit and receive optics described above, it is anticipated that the distance between adjoining nodes will be on average 0.25 miles or less. It is thus desired to provide a transmit beam divergence sufficiently wide to enable transceivers in adjoining nodes to easily reach and maintain alignment as described below, but yet with sufficient power to reliably transmit and receive infrared signals.

A transmit beam divergence in the range of 0.5–1.0 degrees, nominally 0.8 degrees, is sufficient to provide the desired operating characteristics. This relatively wide beam divergence is counter to the extremely narrow beam divergence generally used for optical communications.

The visible field of view of APD 118A, is selected to be slightly smaller than the transmit beam divergence. In this manner, if one transceiver can receive light and/or data from another transceiver, then the assumption can be made that the transmitting transceiver can also receive signals from the receiving transmitter. This asynchronous alignment ability, described in further detail below, is useful in establishing and maintaining alignment between communicating nodes.

It will be appreciated that the dispersion and related characteristics of the received beam have been obtained through the use of a relatively small and inexpensive APD in combination with a relatively small and inexpensive dome lens.

The present inventors have achieved the desired operating characteristics using affordable, components, particularly plastic lenses, plastic housings, off-the-shelf LEDs, and off-the-shelf APDs, thus making each network node affordable and readily constructed.

It will now be apparent that numerous other configurations of transmit and receive optics may be used to achieve the same functional results.

Network System & Electronics

Figure 9:
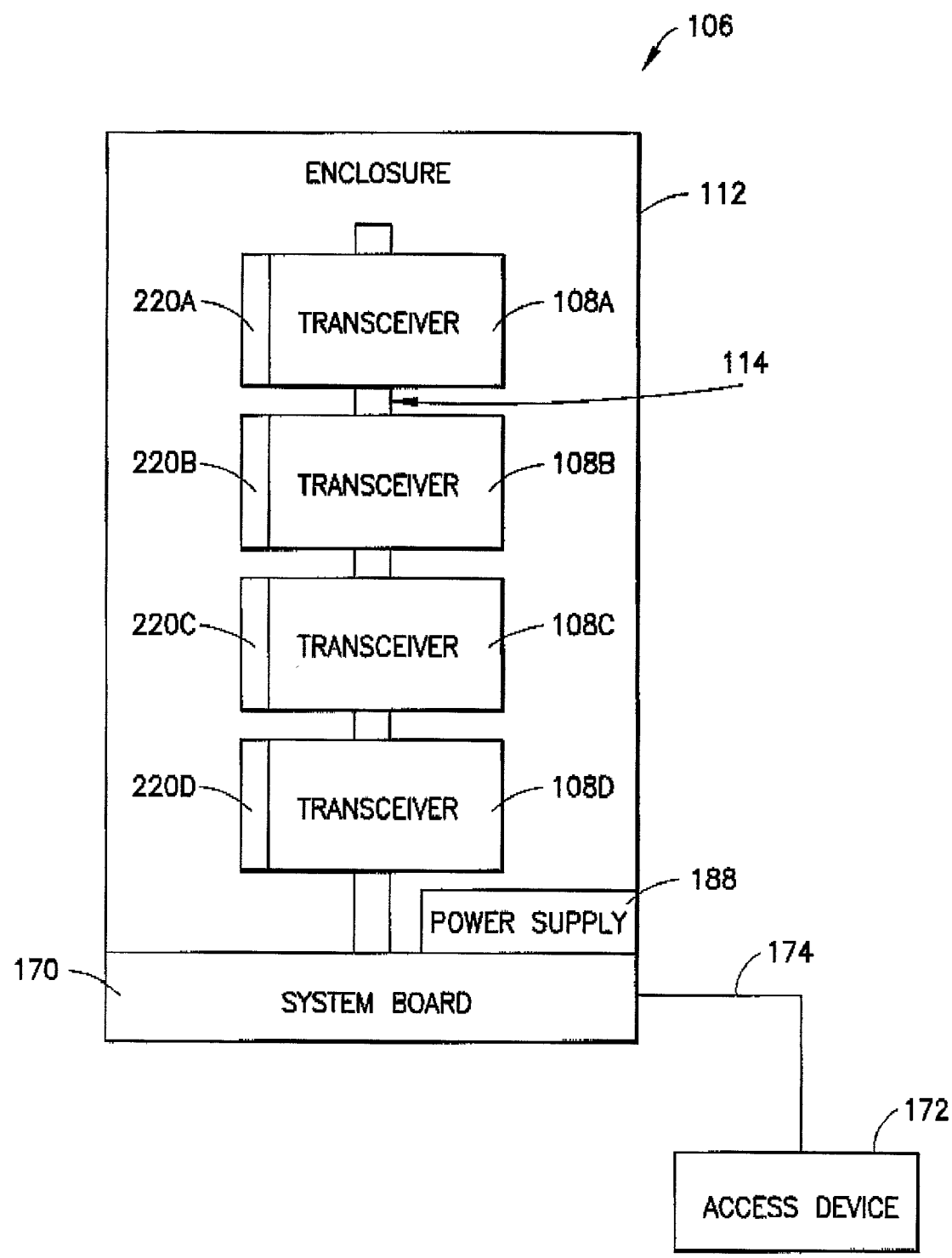
FIG. 9 is a diagrammatic view of the network node showing the interconnection of the infrared transceivers with the main system board and access connector.
Figure 10:
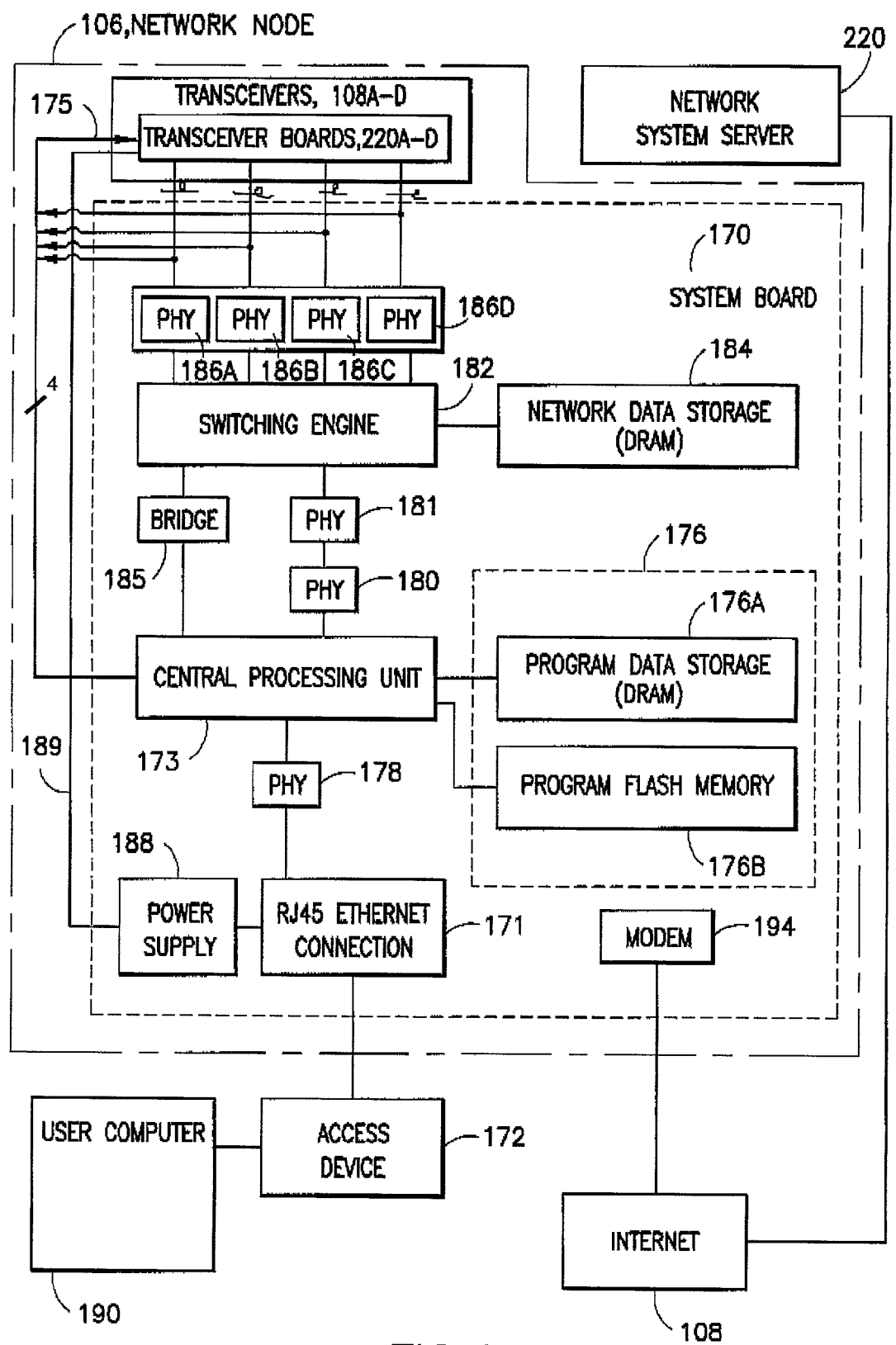
FIG. 10 is a block diagram view of the network node system board from FIG. 9 including interconnections to off-board components.

With reference now to FIGS. 9 and 10, FIG. 9 shows a diagrammatic view of network node 106 including an internally contained system board 170 connected to an external access device 172. Each transceiver 108A-D is shown diagrammatically mounted on the central shaft 114 and has associated with it a respective transceiver board 220A-D. A power supply board 188 further resides within the weatherproof housing of network node 106. As will be shown in further detail below, system board 170 is connected to each respective transceiver board 220D by means of a cable. In one embodiment, various electrical and power conductors may extend through the hollow center of central shaft 114.

With reference to FIG. 10, a block diagram of system board 170 in network node 106 is shown including a central processing unit 173 connected to a memory storage device 176, the memory storage device including appropriate combinations of magnetic, optical and semiconductor storage.

As shown, memory device 176 includes DRAM memory 176A and flash memory 176B for storing various program instructions and data as described below.

System board 170 further includes a Fast Ethernet/IP switching engine 182 connected to its own dedicated memory device 184. A bank 186 of four physical layer (PHY) devices 186A-D is situated on system board 170, each PHY serving as a packet data interface between a transceiver and switching engine 182. In FIG. 10, the PHY devices are illustrated as a bank of four Fast Ethernet (100-Base FX) PHYs 186A-D.

It will be understood that the signals between the switching engine and the PHY correspond to Fast Ethernet format generated by a media access controller (MAC) which, in the described embodiment, is integrated into the CPU and the switching engine. It will be understood that the MAC can comprise a separate component. It will be understood that other physical layer protocol and devices may be used as interfaces between the transceivers and the switching engine. In an alternate embodiment the PHY devices may also be integrated as part of the switching engine and the CPU.

Continuing with FIG. 10, switching engine 182 is connected to CPU 173 by means of two interfaces. One of the interfaces is through a bridge device 185. Another interface is through a pair of Fast Ethernet PHYs, 180 and 181, connected back to back. Bridge interface 185 is used to exchange switch control and management information between switching engine 182 and CPU 173. The bridge interface is also used for the exchange of management related IP data packets between the network and the CPU through the switching engine. As described in detail below, switching engine 182 functions to control the routing of high-speed network data.

It will be understood that in alternate embodiments the pair of PHYs, 180 and 181 can be eliminated and substituted, for example, by a compatible media-independent-interface provided by the CPU and switching engine. In another embodiment, either or each of the PHYs could be integrated with the CPU and/or the switching engine.

As shown in FIG. 10, system board 170 is connected directly to each transceiver in the network node through conductors in a cable 175, one cable provided for each transceiver. Each cable 175 consists of one pair of conductors for carrying data signals from switching engine 182 to a transceiver, one pair of conductors for carrying data signals from the transceiver to the switching engine, one conductor for carrying serial data from CPU 173 to a micro controller on the transceiver board (described below) and one conductor for carrying serial data from the transceiver micro controller back to CPU 173. Cable 175 includes additional cables for providing power and ground to the transceiver. As described here, CPU 173 communicates with each transceiver micro controller by means of serial data.

Processor 173 is also connected to the access device 172 by means of a cable through Fast Ethernet (100-Base TX) physical layer interface (PHY) device 178 and Ethernet connector 171. The cable, commonly known in the industry as Category-5 cable, consists of 8 individual conductors and is widely used to carry Fast Ethernet (100-Base TX) data. Following the industry standard, four of the conductors are used to carry 100-Base-T data signals between access device 172 and CPU 173. The remainder of the 4 conductors is used to provide unregulated 48 Volts DC power and ground from the access device to the switching power supply 188. Both ends of the cable are terminated using the industry standard connectors commonly referred to as RJ-45. The unregulated 48 Volts DC power is stepped down by the switching power supply 188 to provide regulated power supplies to the system board as required by various electronics components in the system. Power supply 188 also provides powers to the transceivers boards 220A-D through cable 175.

In one exemplary embodiment, processor 173 comprises an AMD brand Au1000N processor and switching engine 182 comprises a Galileo brand GT-48511 A Fast Ethernet/IP switching engine. It will be appreciated that other processors may be substituted for CPU 173 and other packet switching devices for switching engine 182.

One exemplary user computer 190 is shown, for example comprising a typical personal computer, connected to access device 172 through a high-speed digital connection, for example an industry standard Ethernet Cat 5 cable connection. User computer 190 is, for example, contained in one of the neighborhood homes described above. A conventional modem 194 is further provided on system board 170 and connected to the Internet 103. Modem 194 is used in the manner described below to access a network system server 202 for initial setup and various other local processes, the network system server used to control the mesh IP network in the manner described below. Modem 194 can be used, for example, to dial up system server 202 directly or through an intermediate ISP. Alternatively, a short-range wireless radio frequency network communications card (not shown) can be built into each network node, the modem and/or wireless radio frequency network communication card enabling adjacent nodes to communicate during, for example, installation and alignment procedures of the type described below.

Switching engine 182 performs the primary function of switching and routing high-speed IP data packets. In the embodiment described herein, switching engine 182 receives IP data packets encapsulated as Fast Ethernet data packets from the six interfaces: the four 100-Base FX (Fast Ethernet) PHYs 186A-D connected to the transceivers, the one 100-Base TX (Fast Ethernet) interface PHYs 180, 181 connected to the CPU 173 and the one bridge interface 185 connected to the CPU.

The switching engine 182 makes the switching decision on each packet based on information contained within its data packet header, such as the IP header. As is known in the art, the IP header consists of the IP addresses of the sender and the destination of the packet. For added flexibility in making a routing decision, the switching engine can also use information contained within a Fast Ethernet packet header. As is also known in the art, a Fast Ethernet packet header consists of, among other things, source address, destination address, VLAN ID etc. In order to provide more sophisticated network services to each packet, the switching engine may also examine other parameters contained within each IP packet, such as the TCP port number. Once the data packet switching engine 182 has processed the incoming information and made a data routing decision, the data packet can be transmitted out on any one of its six interfaces.

In the present embodiment of the invention, processor 173 serves three primary functions. It serves, through the switching engine 182, as an interface between the mesh network of infrared nodes and the user accessing the network through access device 172. This function allows for network operators to implement any kind of processing of packets received from each user before such packets enter the network through switching engine 182. Such processing includes but is not limited to authentication, encryption, data rate limitation, etc.

The processor further serves as an agent of network system server 202 for configuration and management of switching engine 182. Such configuration and management may include but are not limited to managing the switching engine's routing table update and network failure recovery.

Processor 173 further performs tracking functions between infrared network nodes, descriptions of which are detailed below. In the described embodiment, CPU 173 operates using the Linux operating system supporting subprocesses needed to implement functions described above. Alternate operating systems, for example Windows CE or others, would likewise suffice.

Figure 11:
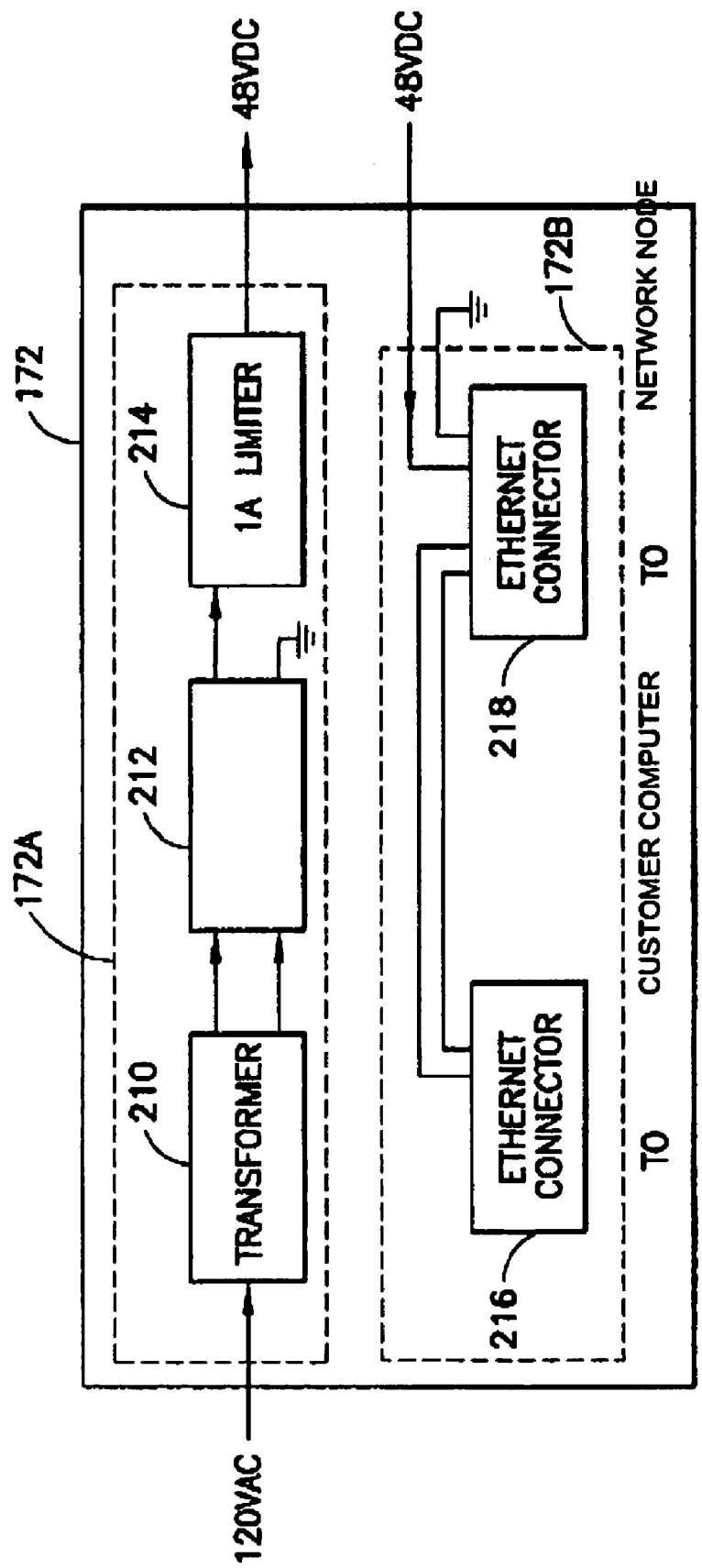
FIG. 11 is a block diagram view of the access device of FIGS. 9 and 10.

With reference now to FIG. 11, one exemplary embodiment of access device 172 is shown including a power supply 172A and a signal conductor 172B. Power supply 172A includes a conventional 60 Hz transformer 210 connected serially to a conventional rectifier and capacitor circuit 212 and a 1 Amp limiter 214 for converting 120 Volt AC to unregulated 48 Volt DC. Signal conductor 172B includes an appropriately connected, grounded Ethernet connector 216 for connecting to user computer 190. The 48 Volt output of power supply 172A is used to provide power to Ethernet connector 218 and hence to system board 170.

Figure 12:
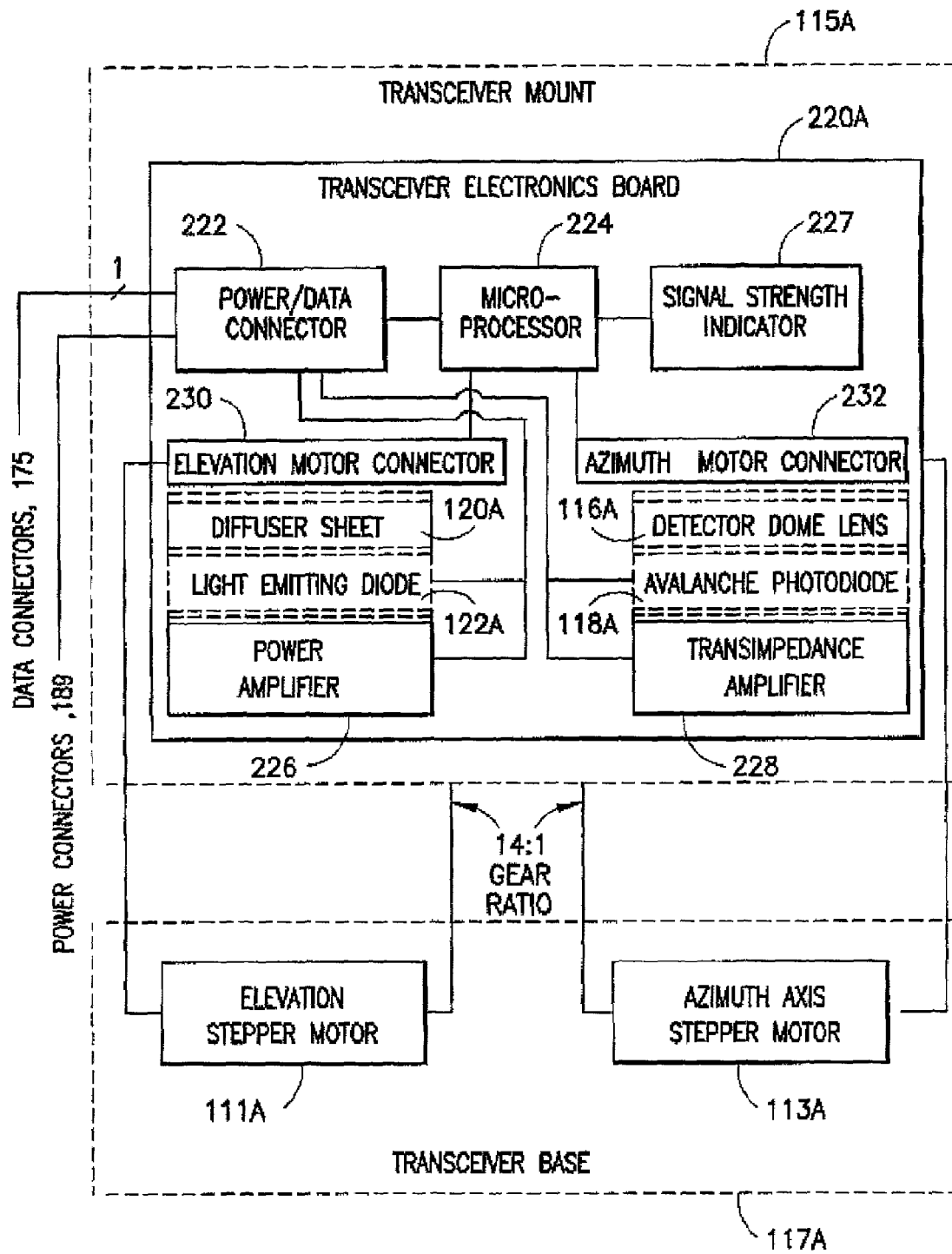
FIG. 12 is a block diagram view of a network node transceiver board including interconnections to off-board components.
Figure 13:
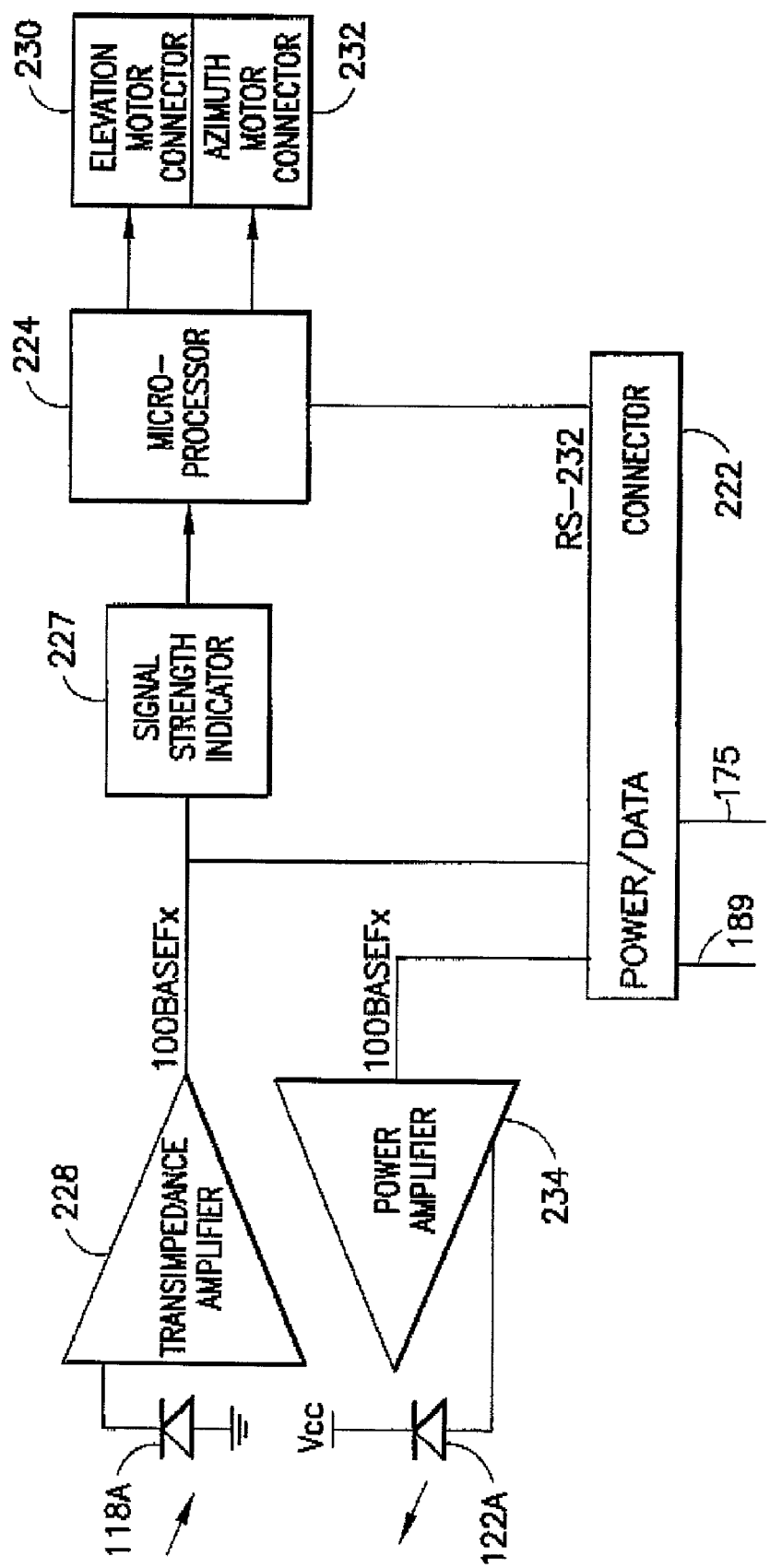
FIG. 13 is a block diagram showing the connection of selected components of FIG. 12.

With reference now to FIGS. 12 and 13, there is shown a single transceiver electronics board 220A, mounted on transceiver mount 115A (see FIGS. 2, 3) connected to the system board 170 (FIG. 10) via power conductor 189 from power supply 188 (FIG. 10) and cable 175. For each transceiver board such as 220A, cable 175 includes two lines of control data from processor 173 for controlling the elevation and azimuth stepper motors 111A, 113A, respectively, and four lines of Ethernet data for transmitting and receiving data.

Transceiver electronics board 220A supports power and data conductors, indicated at power/data connector 222, the power being connected to all the transceiver sub-systems, the control data signals being connected to a microprocessor 224, and the Ethernet data signals being connected to a power amplifier 226 and a transimpedance amplifier 228. An elevation motor connector 230 is connected between microprocessor 224 and elevation motor 11A. An azimuth motor connector 232 is likewise connected between microprocessor 224 and azimuth motor 113A.

Elevation and azimuth motors 111A and 113A, respectively, are shown connected to transceiver base 117A, the base and mount 115A connected by two separate 14:1 gear assemblies for dividing down the arcuate motion of the motors as described herein above.

LED 122A, diffuser sheet 120A, dome lens 116A and APD 118A, each mounted separately on transceiver mount 115A in the optics assembly described herein above, are for explanatory purposes shown in FIG. 12 in dotted line. LED 122A and APD 118A are additionally shown schematically in the schematic diagram of FIG. 13.

A signal strength indicator 227 is connected to microprocessor 224 for sensing the strength of an incoming signal detected by APD 118A through transimpedance amplifier 228.

The control signal data from the conductors in cable 175 is routed through power/data connector 222 to microprocessor 224, the microprocessor in turn providing control signals to the elevation and azimuth stepper motors through the connectors 230, 232.

The Ethernet data from the appropriate conductors in cable 175 includes 2 transmit data conductors connected to power amplifier 226 for driving LED 122A to transmit Ethernet data and 2 receive data connectors connected to transimpedance amplifier 128 for receiving Ethernet data detected by APD 118A.

Figure 14A:
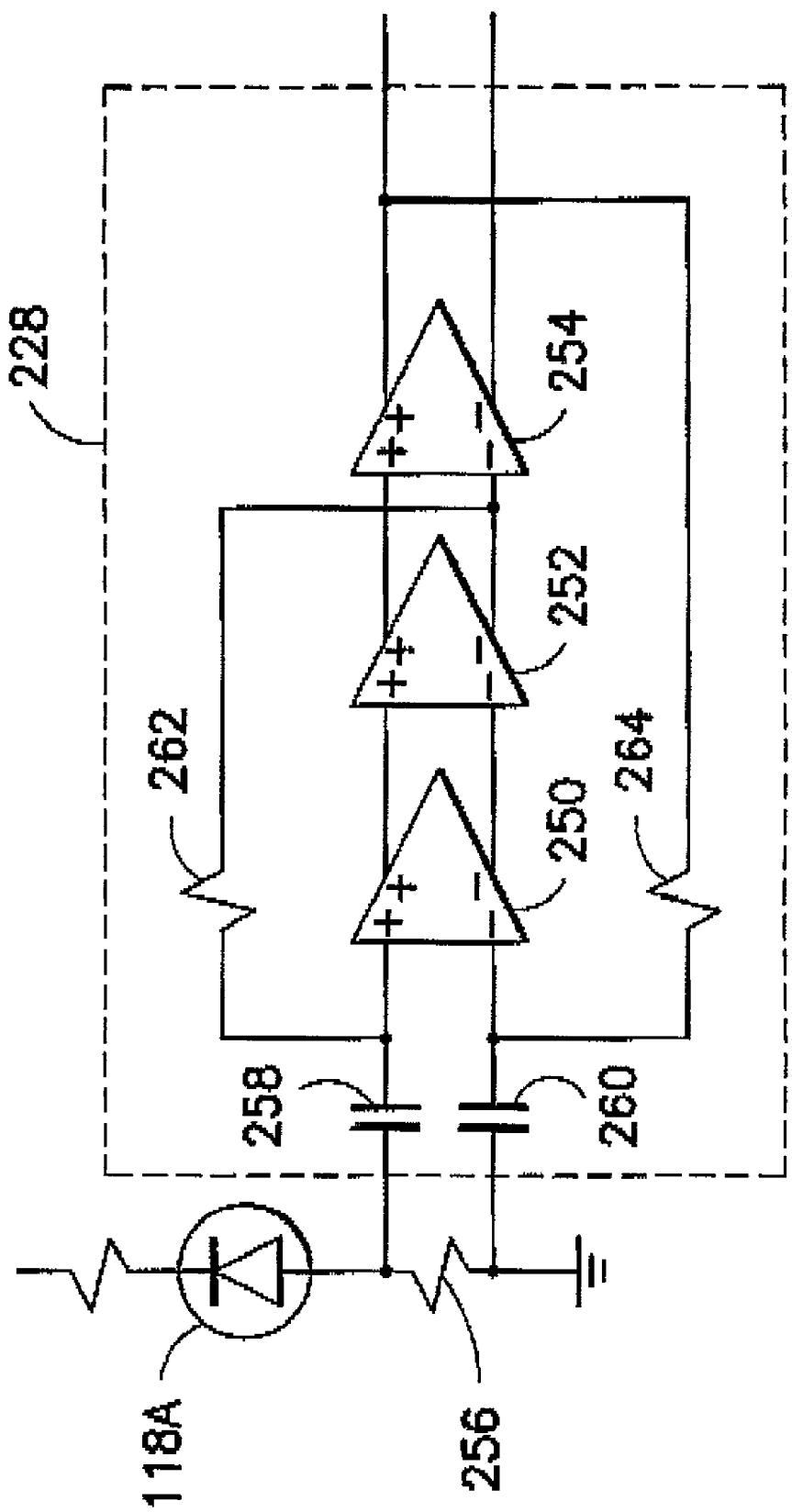
FIG. 14A is a block diagram of the transimpedance amplifier of FIG. 12.
Figure 14B:
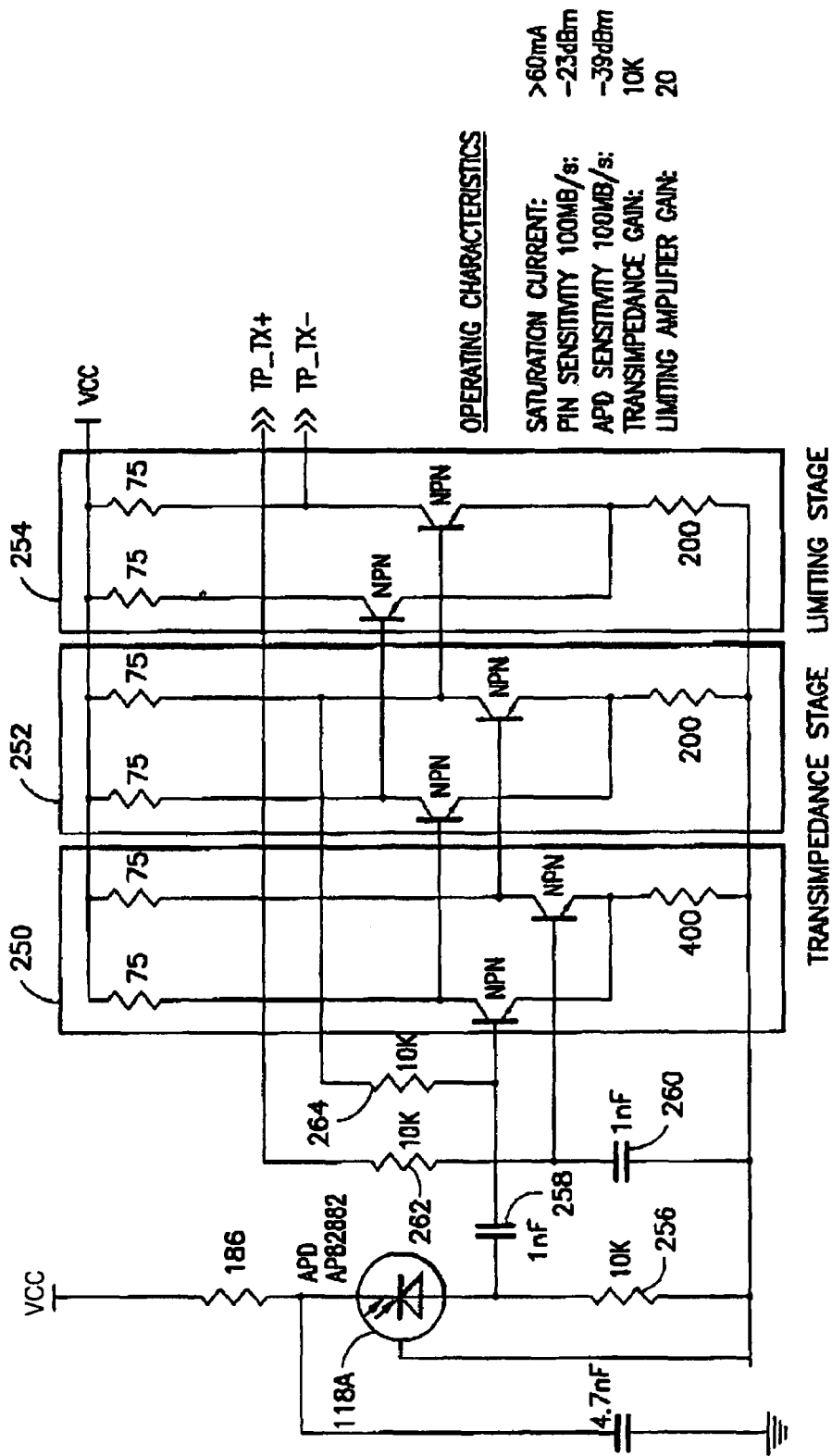
FIG. 14B is a schematic circuit diagram of the transimpedance amplifier of FIG. 14A.

With reference now to FIGS. 14A and B, transimpedance amplifier 228 is seen, in accordance with one embodiment of the present invention, to include three series-connected differential pair amplifiers (DPAs) 250, 252, 254, each consisting of two NPN RF transistors. APD 118A is connected to the inputs of DPA 250 across a resistor 256 through a pair of capacitors 258, 260, capacitor 258 connected to the positive input of DPA 250 while capacitor 260 is connected to the negative input of the DPA. A resistor 262 is connected between the positive output of DPA 254 and the negative input of 250. A resistor 264 is connected between the negative output of DPA 252 and the positive input of DPA 250.

In operation first with respect to transimpedance amplifier 228, the amplifier performs the well-known function of converting an input current to a limited or clipped output voltage, whereby to amplify the relatively low photo-detective current generated by APD 118 upon the receipt of IR signals. The design using feedback resistors 262, 264 provides outstanding gain and sensitivity without the need for expensive matched-pair differential amplifiers typical of the prior art. The frequency response of the amplifier can also be well controlled, eliminating the need for additional filtering.

In operation with respect to the transceiver electronics board 220A and its interaction with system board 170 (FIG. 10), the boards provide a plurality of functions.

More specifically, with respect to the elevation and azimuth position of the transceiver optics, transceiver electronics board 220A functions to receive motor control signals from CPU 173 (FIG. 10) and provide them via microprocessor 224 and elevation and azimuth motor connectors 230, 232 to the respective elevation and azimuth stepper motors 111A, 113A.

With respect to data transmission, transceiver electronics board 220A functions to receive Ethernet data from PHYs 186A, B, C, D (see FIG. 10) through connector 222 to drive LED 122A through power amplifier 226 for transmitting IR data to an adjoining node (see FIG. 1). Data from the user computer is conveyed through various intervening connectors, conductors and converters through CPU 173 to switching engine 182 and data from other transceivers are relayed through switching engine 182. As described elsewhere herein, in the present embodiment the network comprises an IP network, managing packet-switched data in accordance with Internet protocol standards.

With respect to data receipt, transimpedance amplifier 228 converts current generated through the receipt of IR data by APD 118A into electronic signals, which are transmitted through connector 222 to PHYs 186A, B, C, D. Received data which is destined for the user computer is passed from switching engine 182 through CPU 173 and the various intervening connectors, conductors and converters, while data from other transceivers are relayed through switching engine 182 for transmission by another transceiver to another node.

With respect to the installation, alignment and tracking of the transceivers in the system node, signal strength indicator 227 detects the relative power of the incoming signal received by APD 118A into transimpedance amplifier 228 and transmits the same to CPU 173. This signal strength is used in the manners described below to align newly installed network node transceivers and to realign existing transceivers already on the network.

It will thus be seen from a consideration of FIGS. 10, 11 and 12 that system board 170, of which there are one per network node 106, contains electronics pertinent to each of the transceivers within the node. The transceiver electronics boards, of which there is one per transceiver 108A-D, contain electronics pertinent to the operation of each individual transceiver.

From a consideration of the above, it will be understood that high-level IP network management functions are determined by network system server 202 and communicated to the various system nodes for storage in the system and transceiver boards. Local control of the nodes and transceivers is performed through the operation of the system and transceiver boards in each node. It will be further understood that certain operating programs and control information may be loaded onto the system and transceiver boards upon assembly so that it is available before the installation of the node into the network, for example to facilitate the initial tracking process described below. It will be apparent that many different strategies for loading and updating data and software within the nodes may be implemented in accordance with the present invention.

While the present embodiment of the invention has been shown and described with respect to one neighborhood network of nodes, it will be understood that multiple such networks can exist over greatly diverse geographical areas. Such networks can communicate and exchange data with each other through intermediary networks. In one embodiment, for example, multiple neighborhood networks may connect through a common system node(s) 202, which provides common management support to each neighborhood network. In another embodiment, various neighborhood networks may be separately managed through separate network servers and connect through one or more intermediary servers and or intermediary networks of differing type. It will now be apparent that numerous configurations of networks can exist in accordance with the present invention.

Network Operation—New Node Installation

With reference now to FIGS. 15A & B there is shown a process 300 for installing a new node 106 into an established mesh network of nodes 100 (FIG. 1). As described, a tracking or synchronization process is initiated whereby selected transceivers within the new and existing nodes are relatively positioned such that those selected transceivers can exchange data. The new node is then acquired into the existing network, becoming an active node within the network.

Initially, new node 106 is installed on an upper, outer surface of a structure convenient to a house 102 or other structure containing a computer to be connected to the network (step 302). The node may be installed on the wall, roof or chimney area of a house or on an adjoining structure such as a lamp or utility post. The exact position of the node is selected to provide a line-of-sight to at least one existing node located within the network and within communicating distance. The new node is preferably connected to a user computer within the house through the node's Ethernet connection. This enables the node to communicate with the user both during the installation procedure and subsequently during data transmission and receipt. Every new node is installed level, that is with a zero degree angle of elevation.

A homeowner or a professional installer may install the new node. It will be appreciated that, in accordance with the invention, the installation of the new node is typically sufficiently simple to enable non-professional installation.

Upon securing new node 106 to the supporting structure, the installer orients the node by twisting the entire node assembly so that a particular mark on the outer surface of the weatherproof housing 112 is pointed to compass north (step 304). With the transceivers pre-positioned at the factory in the manner described above, the relative orientation of each transceiver within the node is known, within an error margin, to network server 202.

The newly installed node's location is communicated to network server 202 (FIG. 10) (step 306), for example through a dial-up modem connection on the user computer, or by a telephone call to the server placed by the installer, or using modem 194 on system board 170 (FIG. 10). Alternatively, this communication may be made through the wireless RF network described above.

Network server 202 examines a stored database of nodes within the local network (step 308) to determine adjoining nodes likely to have line-of-sight with the newly installed node (step 310).

If there is no line-of-sight network node contained in the database, the installer, typically a professional installer in this circumstance, will provide the network server 202 with a specific position of an existing network node with which the new node can be synchronized (step 314). This can be done using one of the many communication options described herein above. If one or more line-of-sight nodes exist in the network, the network server will select one existing node for synchronization with the new node (step 316). If more than one line-of-sight nodes exist in the network, a single node is selected using criteria, for example, based on expected load and usage of the various nodes.

To facilitate the actual acquisition of the new node into the network, network server 202 determines necessary synchronization data for both nodes, including but not limited to: the likely best transceivers to use (it will be recalled from a consideration of the above that each node contains four transceivers), a first best guess of the initial directional orientation of each transceiver likely to result in line-of-sight communication following the process described below, the start time to begin the process of synchronization for acquiring the new transceiver into the network, the current time and the angular sweep range of the new and existing transceivers (step 318).

It will be appreciated that the existing transceiver, being integrated into the network, has an accurate determination of a given reference orientation. In contrast, the new transceiver is only approximately oriented to a reference direction by the installer and may have an error in orientation. As will be described in further detail below, during the initial synchronization both the new and existing nodes are swept through the initially determined sweep range likely to insure line-of-sight communication, with the new node additionally sweeping through the angle of uncertainty whereby to account for that uncertainty.

Upon completing the calculation and determination of the relevant synchronization data, server 202 transmits the necessary data to the existing node (step 320) and to the new node (step 324), where the data is stored for the subsequent synchronization and acquisition. Data is transmitted to the existing node through the network. As described above, even though the new node is not active in the network and able to receive network data, synchronization data can be provided by one of the many available options described above, i.e. through the built-in modem, through an upload from the user computer, or through a wireless RF connection.

Network Operation—New Node Synchronization and Acquisition

With reference to FIGS. 16A&B, there is shown a process 330 for synchronizing a new transceiver in a new node with an existing transceiver in an existing node to acquire the new node into the network.

Initially, a clock calibration occurs between the new and existing nodes, using the described alternate means of communication, prior to initiating the described synchronization process. The nodes may further agree to the pre-established or a different start time.

To begin the synchronization, the new and existing nodes each move the selected active transceiver to its respective first best guess of orientation (step 332), each transceiver being maintained level. This is accomplished using the above-described azimuth motors to rotate the transceivers to the starting positions. At the synchronous start time, the azimuth motors are operated within each of the new and existing transceivers whereby to actuate the sweeps within the initially determined angular sweep ranges, both the existing and new transceivers sweeping through the sweep range at approximately the same average speed, with the new node sweeping in an additional back and forth pattern having an angular width of the allowed reference orientation uncertainty (step 334). During the sweeps, relative signal strengths of detected infrared light for each position in the sweep pattern are stored within each of the new and existing nodes.

If a signal is not detected by either transceiver (step 336), then the elevation angle of each transceiver is adjusted in a complementary manner in selected beam-width increments and the sweeps are repeated (step 331). For example, when one-half beam-width increments are selected, the new node will adjust down in elevation approximately one-half the estimated beam width while the existing node will adjust up in elevation approximately one-half the estimated beam width, and the above-described angular sweep repeats. This process of elevation adjustment and sweep is repeated as long as no signal is detected (step 333) by either transceiver and the final limits of both devices are not reached (step 335). Each time a sweep fails to result in a transceiver detection for a particular elevation (step 333) and the device limits are not reached (step 335), that same sweep is repeated in the opposite azimuth direction (step 337) before the elevation angle is again adjusted. It will be understood that various beam-width increments can be used to accomplish the alignment results.

If, after completing sweeps in both directions at the final elevation limits of both transceivers (step 335) infrared light signals are not detected by either the new or existing transceiver, a failure signal is generated by the existing transceiver (step 338) and transmitted to the system board CPU and/or the network server 202 (step 340). The CPU and/or the network server then selects a new existing transceiver (step 342) and provides the tracking data to this existing node, as described above, to restart the synchronization process (step 344) as described above (steps 332–337).

The next existing node may be selected in real-time by the network server or may have been earlier identified by the network server and stored in the system board CPU for use in the event that communications couldn't be established with the first-choice existing node. If, upon repeating the above-described sweep process neither transceiver can detect an infrared signal from each other, a failure indicator is again transmitted to the network server which determines that the new node is faulty and must be reinstalled or replaced (step 346).

If either the new or existing transceiver receives signals during any one sweep (steps 333 or 336) then, upon the completion of that sweep pattern, both transceivers return to the position of maximum signal strength (step 348). It will be understood that, due to the symmetry of the co-aligned transceiver optical systems described above, if either transceiver detects a signal, the assumption is made that the other transceiver has also detected a signal and that both transceivers are returning to the position of maximum infrared light signal strength.

Following the completion of the sweep pattern, the new and existing transceivers execute asynchronous tracking events (described in detail below) (steps 350, 352) one or more times (step 354), followed by an attempt to communicate actual signal data (step 356).

If signal data communication cannot be established within a predetermined number of asynchronous tracking events (step 358) as determined by the system operator, then the sweep pattern is reinitiated (step 334) to re-determine the position of maximum signal (step 348) and the asynchronous tracking events (steps 350, 352) begin again. When signal data communication is established (step 358), then the synchronization of the new and existing transceivers is complete with the new node acquired into the existing network (step 360). The new node is now installed into the network and can function as a normal network node including communicating network data and cooperating to install new nodes into the network. It will be understood that, once installed into the network, the actual orientation of the newly installed node is known and stored for use in subsequent tracking activities. The user of the newly installed node is thus connected to the Internet (or other network.)

Network Operation—Asynchronous Tracking Event

Immediately following the install process described above and periodically thereafter it is necessary to cause a communicating transceiver pair within a network to change its physical position so as to establish and maintain good optical alignment and signal communications between the adjoining transceivers. This process, initiated by network server 202 or by an individual transceiver, is termed a 'tracking event' and is described with respect to the FIG. 17 process illustrating an asynchronous tracking event 370.

The transceivers are tracked asynchronously, each transceiver beginning its tracking event upon the initiation of the network server or on the occurrence of a predetermined time (step 372). Upon initial installation, as described above, an asynchronous tracking event is initiated substantially immediately upon both transceivers returning to their respective positions of maximum signal strength. Upon lost or diminished signal, as described below, an asynchronous tracking event occurs within a certain time slot for each transceiver.

Initially, the relative distance between the two nodes is determined by the node location data contained in network server 202 (step 374). If the distance is less than a predetermined distance, typically about 10 meters, then processor 173 on system board 170 (FIG. 10) of the node containing the transceiver to be repositioned initiates a transceiver centroid-tracking path (step 382). That is, the respective elevation and azimuth motors are operated to move the transceiver in a centroid path, simultaneously collecting and storing signal strength to determine the position yielding maximum signal strength (step 384). At the completion of the centroid tracking path, the transceiver is controlled to return to the position of maximum received signal strength (step 386).

If the actual distance is greater than the predetermined distance (step 374), the transceiver is similarly controlled as above but in a dither tracking path (step 376). Again, receive signal strength is recorded to determine a maximum (step 378) to which the transceiver is returned at the end of the dither path (step 380).

As will be understood from the description of the new node installation process 330 described above, in the asynchronous tracking process, each of the two transceivers involved in the process alternate motion in the tracking event. That is, the first transceiver will complete a tracking path and return to the position of maximum signal strength. Next, the second transceiver will complete a tracking path and likewise return to the position of maximum signal strength. The process of alternating transceivers for tracking events continues for a predetermined number of times. This predetermined number of times may depend on the occurrence of an event, such as the ability to communicate data, or on the completion of a predetermined, stored number of tracking events.

It will be seen from a consideration of the acquisition process described above in combination with the asynchronous tracking event process, that upon the installation of a new node a simple, simultaneous or synchronous sweep in a circular, horizontal path is used to determine initial transceiver positioning, while the appropriate centroid or dither tracking path is used in an asynchronous process to fine-tune transceiver position for maximum signal strength.

It will be appreciated that numerous other tracking paths may be selected to determine optimum transceiver positioning.

Network Operation—Unscheduled Tracking Event

Periodically, due to a variety of conditions including but not limited to changes in tolerance of mechanical components, changes in supporting structures and underlying geography and changes in weather, a transceiver within a network node will lose good signal communications with its 'mate' in the adjoining node. When this happens an unscheduled tracking event process 400 initiates as is shown in FIG. 18.

Upon assembly and initial programming, each transceiver in each node is given a pre-assigned default time slot within which to initiate a tracking event upon the occurrence of an unscheduled signal loss. This default time slot may, for example, be stored on system board 170 in memory 176. No two transceivers within the same neighborhood are provided with the same pre-assigned default time slot. It will be understood that, in this manner, the asynchronous tracking process 370 (FIG. 17) may be performed automatically and without need for the network server to communicate with each transceiver.

Upon the detection of minimally acceptable receive signal strength (step 402), the transceivers to be tracked each begin an asynchronous tracking event within their respective pre-assigned time range (step 404). The asynchronous tracking is performed in accordance with FIG. 17 described above, and if signals are detected and communication is established (step 406) the process terminates (step 408). If no signal is detected by the transceivers and no communication is established, then a service event is initiated (step 410). A service event may, for example, include the transmission of a service notice to a user or a modem communication to the network server. A service event may, for example, result in human intervention to replace a defective network node.

While the above-described tracking processes have been illustrated with respect to infrared transceivers, it will be understood that they similarly apply to other point-to-point communications systems, for example including narrow-band radio frequency and microwave transmitters/receivers, all included herein as point-to-point communications systems or transceivers.

There is thus provided new and improved infrared transceivers, infrared network nodes comprising multiple transceivers, an infrared mesh network, various circuits and various processes for installing and synchronizing new nodes whereby to extend existing high-speed digital network capacity into areas inaccessible by conventional networks for the reasons described above.

The transceiver transmitter optics are designed using infrared light with a relatively wide beam divergence in the range of about 0.5–1.0 degrees. In combination with sensitive receive optics having a slightly smaller field of view, much flexibility is provided in the placement and alignment of the transceivers. This makes installation and expansion of the network cost-effective and straight-forward.

Automated install and synchronization processes operate to keep the network functional and to simplify new installations and changes in network node location.

The system has commercial application in the field of high-speed digital data networks including Internet networks such as those used by Internet Service Providers.

What is claimed is:

1. A method of installing a new point-to-point communications transceiver in a network of existing point-to-point communications transceivers, comprising the steps of:

positioning a new transceiver in a line of sight to at least one existing transceiver;

at a predetermined time, said new transceiver performing a first sweep over a first predetermined range to detect a signal from said existing transceiver;

at said predetermined time synchronously with said new transceiver, said existing transceiver performing a second sweep over a second predetermined range to detect a signal from said new transceiver;

upon the completion of said first sweep of said new transceiver, said new transceiver returning to a position of maximum detected signal strength;

upon the completion of said second sweep of said existing transceiver, said existing transceiver returning to a position of maximum detected signal strength; and if no signal is detected by said new transceiver or said existing transceiver, changing orientations of said new and existing transceivers in opposite directions with respect to the line of sight.

2. The method of claim 1 wherein said changing the orientations comprises incrementally changing respective elevation angles of said new and existing transceivers in opposite directions with respect to the line of sight, and repeating said first and second sweeps to determine if a signal is detected.

3. The method of claim 2 wherein said changing the respective elevation angles of said new and existing transceivers is repeated in half-predicted-beam-width increments while repeating said first and second sweeps to determine if a signal is detected.

4. The method of claim 3 wherein if no signal is detected after repeatedly changing the respective elevation angles and reaching final elevation limits of said new and existing transceivers in half-predicted-beam-width increments while repeating said first and second sweeps, an error is reported and a second existing transceiver is selected to install said new transceiver.

5. The method of claim 1 wherein said changing the orientations comprises incrementally changing respective orientation angles of said new and existing transceivers in a complementary manner.

6. The method of claim 1 and further including the steps of:
storing, during said first sweep of said new transceiver, a detected signal strength; and
storing, during said second sweep of said existing transceiver, a detected signal strength.

7. The method of claim 1 and further including the steps of:
after said new transceiver returns to a position of maximum detected signal strength, with said existing transceiver stationary, tracking said new transceiver over a first predetermined path to determine a new position of maximum signal strength in said first predetermined path; and
after the completion of said tracking of said new transceiver, returning said new transceiver to said new position of maximum signal strength in said first predetermined path.

8. The method of claim 7 and further including the steps of:
after said existing transceiver returns to a position of maximum detected signal strength, with said new transceiver stationary, tracking said existing transceiver over a second predetermined path to determine a new position of maximum signal strength in said second predetermined path; and
after the completion of said tracking of said existing transceiver, returning said new transceiver to said new position of maximum signal strength in said second predetermined tracking path.

9. The method of claim 8 wherein said first and second sweeps are each generally circular sweeps.

10. The method of claim 9 wherein said first and second predetermined tracking paths each comprises a dither path.

11. The method of claim 8 and further including the steps of:
monitoring the detected signal strength of said new transceiver;
monitoring the detected signal strength of said existing transceiver;
if said detected signal strength of said new or said existing transceiver falls below a predetermined threshold, then repeating each of said tracking of said new transceiver in said first predetermine tracking path and said tracking of said existing transceiver in said second predetermined path to return each of said new and existing transceivers to new positions of maximum signal strength.

12. The method of claim 11 wherein said step of repeating each of said tracking of said new transceiver and said existing transceiver is initiated at a first time preprogrammed for said new transceiver and a second time preprogrammed for said existing transceiver.

13. The method of claim 1 wherein said new and existing transceiver each comprise an infrared transceiver.

14. The method of claim 1 wherein said new transceiver is mounted in a housing, said step of positioning said new transceiver to point in a predetermined compass direction including positioning said housing to point in a selected compass direction.

15. The method of claim 1, further comprising positioning said new transceiver to point in a predetermined compass direction.

16. A system for installing a new point-to-point communications transceiver in a network of existing point-to-point communications transceivers, the system comprising:
means for positioning a new transceiver in a line of sight to at least one existing transceiver;
means operative at a predetermined time, for initiating said new transceiver to perform a first sweep over a first predetermined range to detect a signal from said existing transceiver;
means operative at said predetermined time, for initiating said existing transceiver to perform a second sweep over a second predetermined range to detect a signal from said new transceiver;
means operative upon the completion of said first sweep of said new transceiver, for initiating said new transceiver to return to a position of maximum detected signal strength;
means operative upon the completion of said second sweep of said existing transceiver, for initiating said existing transceiver to return to a position of maximum detected signal strength; and
means for changing orientations of said new and existing transceivers in opposite directions with respect to the line of sight, if no signal is detected by said new transceiver or said existing transceiver.

17. The system of claim 16, further comprising means for positioning said new transceiver to point in a predetermined compass direction. existing transceiver.

18. A system for installing a new point-to-point communications transceiver in a network of existing point-to-point communications transceivers, comprising:
a processor;
a memory connected to said processor;
said memory being configured to operate with control instructions stored in said processor to cause said processor to perform:
positioning a new transceiver in a line of sight to at least one existing transceiver, said new transceiver performing a first sweep over a first predetermined range at a predetermined time to detect a signal from said existing transceiver;
at said predetermined time synchronously with said new transceiver, said existing transceiver performing a second sweep over a second predetermined range to detect a signal from said new transceiver;
upon the completion of said first sweep of said new transceiver, said new transceiver returning to a position of maximum detected signal strength;
upon the completion of said second sweep of said existing transceiver, said existing transceiver returning to a position of maximum detected signal strength, and
if no signal is detected by said new transceiver or said existing transceiver, changing orientations of said new and existing transceivers in opposite directions with respect to the line of sight.

19. The system of claim 18, wherein the system is adapted for performing positioning said new transceiver to point in a predetermined compass direction.

* * * * *

UNITED STATES PATENT AND TRADEMARK OFFICE
CERTIFICATE OF CORRECTION

PATENT NO. : 7,236,705 B2 Page 1 of 1
APPLICATION NO. : 10/162475
DATED : June 26, 2007
INVENTOR(S) : Moursund et al.

It is certified that error appears in the above-identified patent and that said Letters Patent is hereby corrected as shown below:

In the Claims

Column 20, line 31, Claim 17   Delete "existing transceiver."

Signed and Sealed this

Fourth Day of December, 2007

JON W. DUDAS
*Director of the United States Patent and Trademark Office*